US007848633B2

(12) United States Patent
Sugimoto

(10) Patent No.: US 7,848,633 B2
(45) Date of Patent: Dec. 7, 2010

(54) IMAGE TAKING SYSTEM

(75) Inventor: Masahiko Sugimoto, Asaka (JP)

(73) Assignee: Fujifilm Corporation, Tokyo (JP)

( * ) Notice: Subject to any disclaimer, the term of this patent is extended or adjusted under 35 U.S.C. 154(b) by 533 days.

(21) Appl. No.: 11/782,732

(22) Filed: Jul. 25, 2007

(65) Prior Publication Data

US 2008/0025710 A1    Jan. 31, 2008

(30) Foreign Application Priority Data

Jul. 25, 2006   (JP)   ............... 2006-202469
Jun. 14, 2007   (JP)   ............... 2007-157531

(51) Int. Cl.
G03B 17/00     (2006.01)
G03B 7/00      (2006.01)

(52) U.S. Cl. ...................... 396/264; 396/213
(58) Field of Classification Search ................ 396/213, 396/263–264, 286, 472
See application file for complete search history.

(56) References Cited

U.S. PATENT DOCUMENTS 5,119,123  A  *  6/1992  Tominaga et al. ............. 396/59
6,101,336  A  *  8/2000  Nonaka ....................... 396/121
6,122,450  A  *  9/2000  Nakahara et al. ............. 396/80
6,996,340  B2 *  2/2006  Yamaguchi et al. ......... 396/263
7,574,128  B2 *  8/2009  Matsuda ..................... 396/264
2007/0025722 A1 *  2/2007  Matsugu et al. ............. 396/263
2007/0086648 A1    4/2007  Hayashi

FOREIGN PATENT DOCUMENTS

| CN | 1658655 A | 8/2005 |
| JP | 10-293342 | 11/1998 |
| JP | 11-142725 A | 5/1999 |
| JP | 2000-196934 A | 7/2000 |
| JP | 2001-324667 A | 11/2001 |
| JP | 2005-3852 A | 1/2005 |
| JP | 2005-277907 A | 10/2005 |
| JP | 2005277907 A * | 10/2005 |
| JP | 2007-110575 A | 4/2007 |

* cited by examiner

Primary Examiner—W. B. Perkey
Assistant Examiner—Dennis Hancock
(74) Attorney, Agent, or Firm—Sughrue Mion, PLLC

(57) ABSTRACT

In an image taking system, when a running image is to be taken by the use of a self-timer or an automatic image taking system, exposure conditions and a focusing position are determined according to result of detection of the predetermined objective body at least once between the time when instruction to take a running image is done and the time when the running image is actually taken.

23 Claims, 25 Drawing Sheets

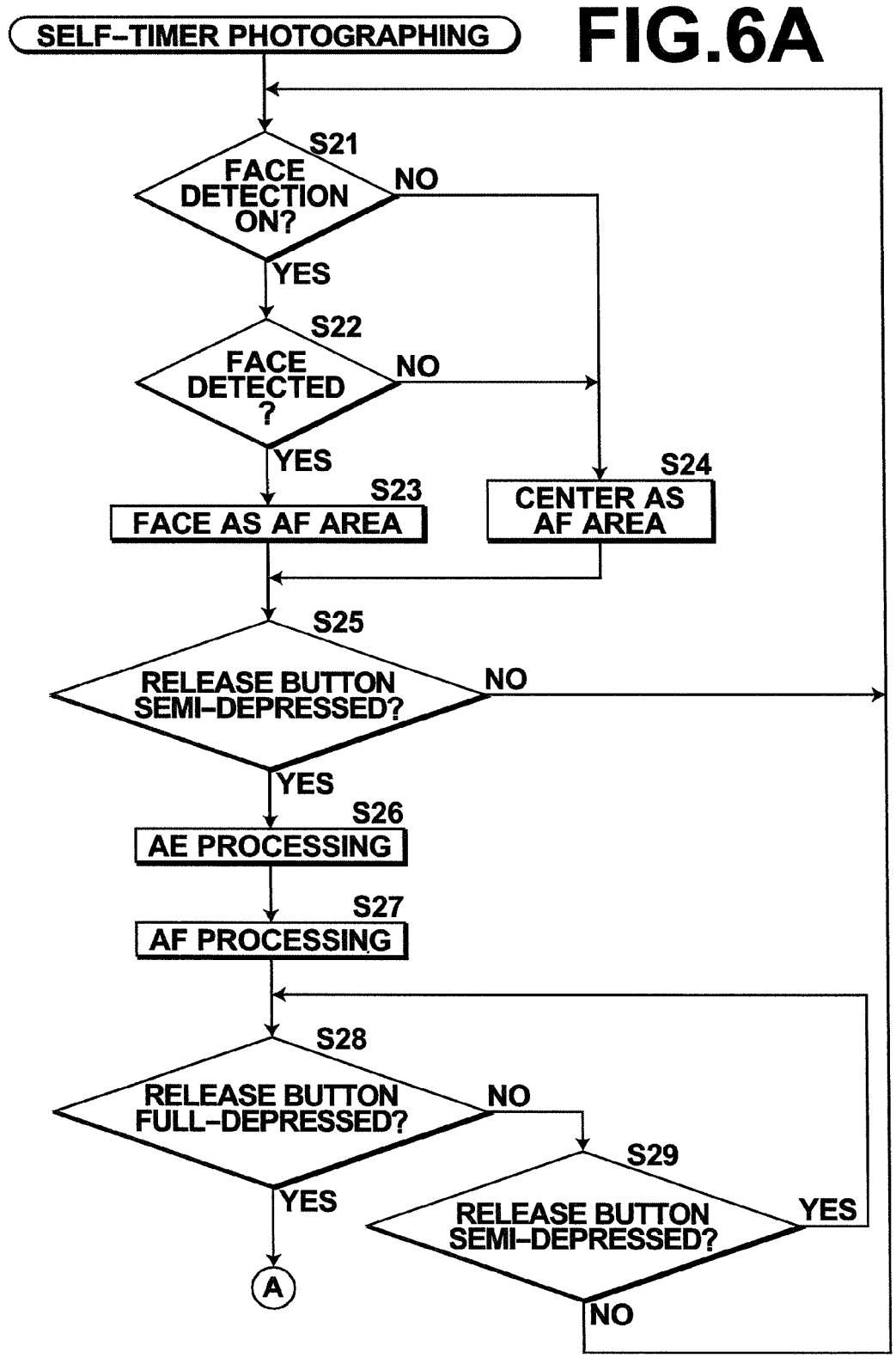

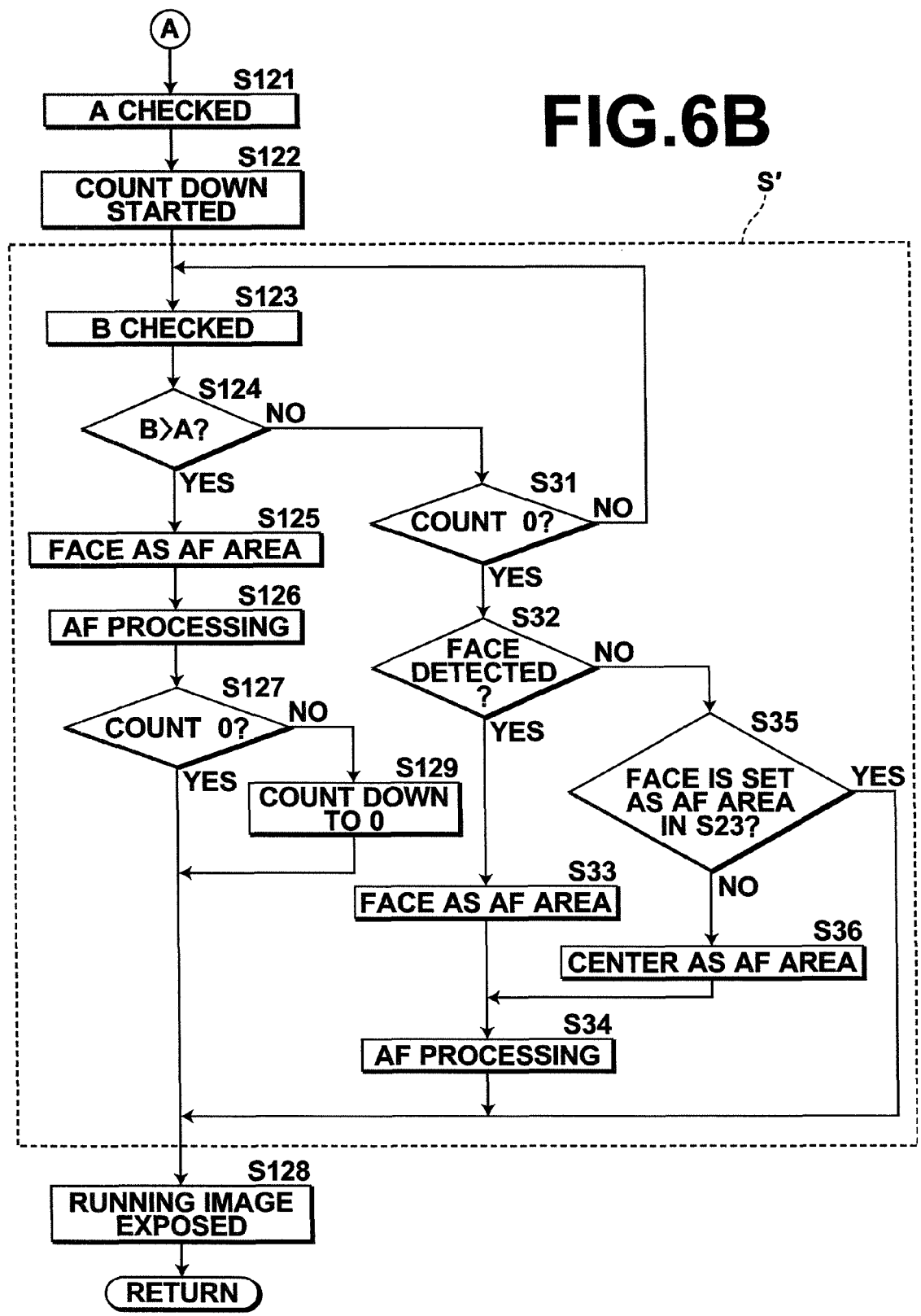

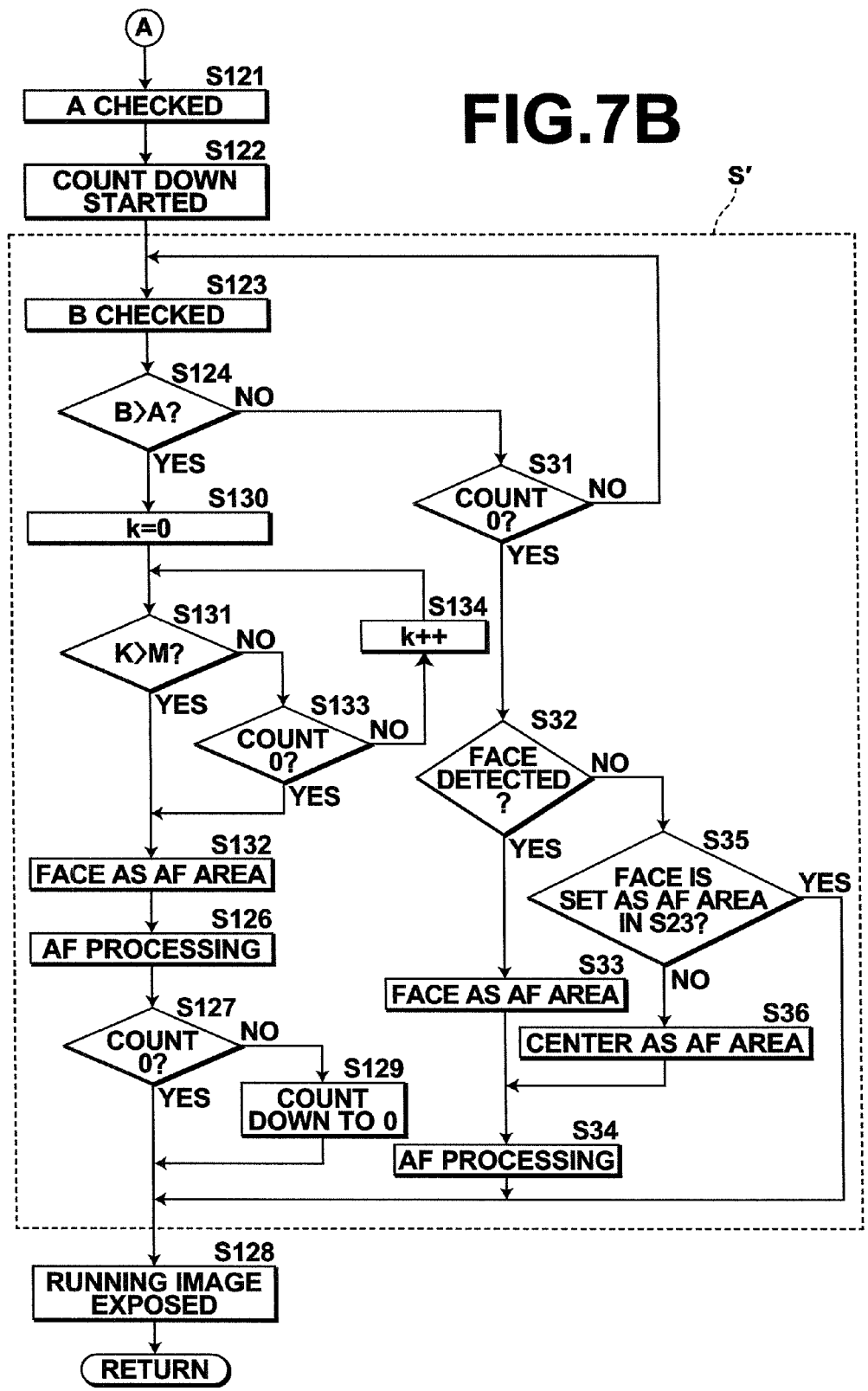

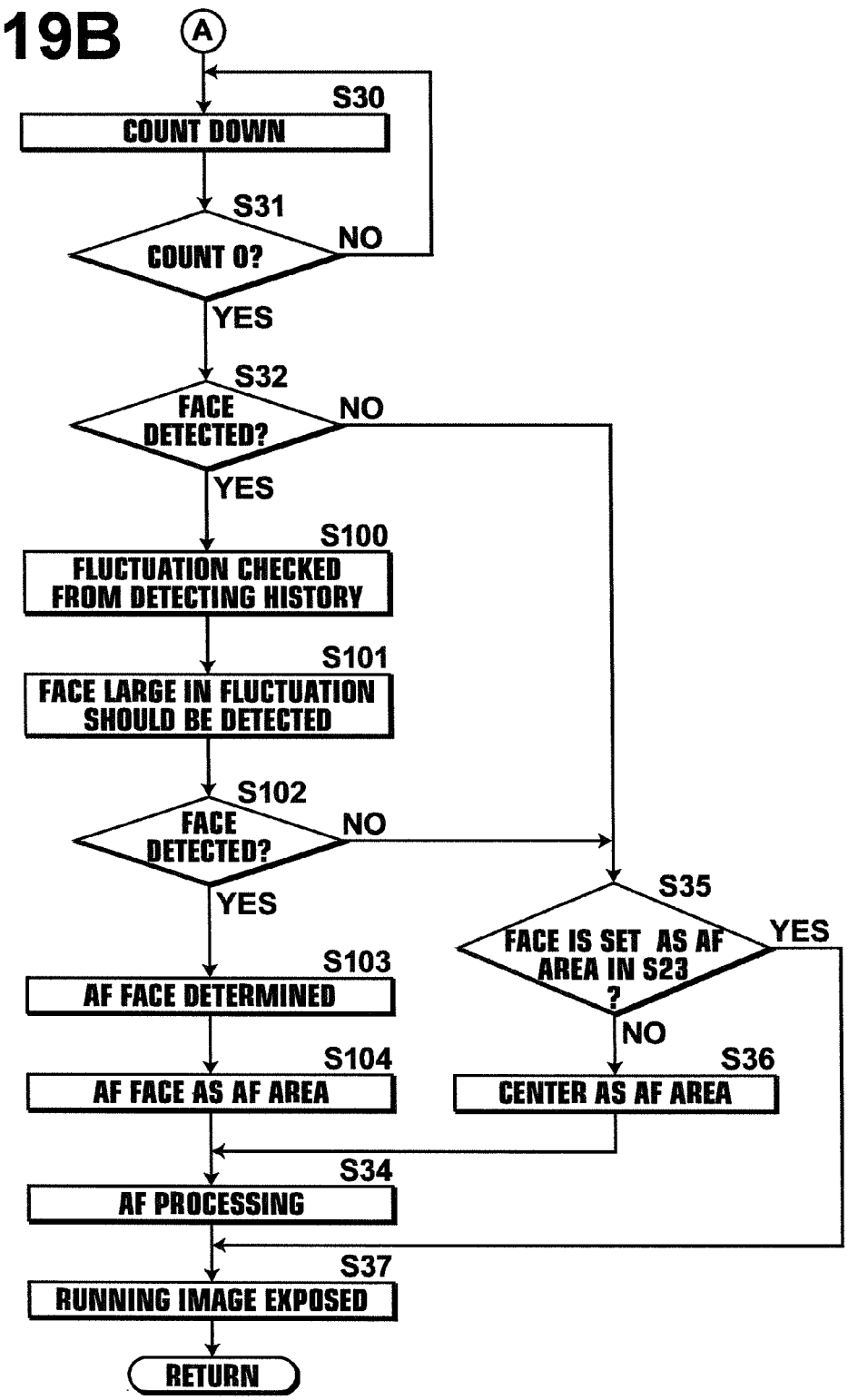

IMAGE TAKING SYSTEM

BACKGROUND OF THE INVENTION

1. Field of the Invention

This invention relates to an image taking system such as a digital still camera with a self-timer function or an automatic photographing function.

2. Description of the Related Art

There has been put into practice a digital camera and a digital video camera having a self-timer function which actually takes an image of an object predetermined times after depression of a shutter release button or an automatic photographing function which actually takes an image of an object at an arbitrary timing. For example, an image taking system, where photographing is carried out at a desired timing without affected by the self-timer by starting or terminating the photographing, when after a desired part is designated on an through image, the desired part changes (Japanese Unexamined Patent Publication No. 2000-196934), and an automatic image taking system where a human to be photographed is detected in the image input into the camera, whether the photographed state is good or bad is determined from the position of the human to be photographed, and the photographing is carried out when the photographed state is good, whereby a picture free from unnatural loss of a part of the face or the body of the human to be photographed (Japanese Unexamined Patent Publication No. 2005-003852), have been proposed.

On the other hand, in an image taking system such as a digital camera, there has been done AE processing, where exposure conditions are determined according to a detected predetermined object body by detecting the predetermined object body in a through image or a pre-image taken in response to semi-depression of the shutter release button, or AF processing where a focusing position (a position in which the camera is in focus) is determined according to a detected predetermined object body by detecting the predetermined object body in a through image or a pre-image taken in response to semi-depression of the shutter release button. However, when photographing is done by the use of the self-timer function or the automatic photographing function, since there is a time interval between the time when the shutter release button is full-depressed, i.e., when instruction to start photographing is done, and the time when a running exposure is started, i.e., when a running photographing is started, for instance, when the photographing is carried out with the human to be photographed employed as the object body, the conditions of the object body can change whereby the brightness of the object body and/or imaging position can be shifted.

SUMMARY OF THE INVENTION

In view of the foregoing observations and description, the primary object of the present invention is to provide an image taking system which can obtain an image where the brightness and/or the focusing position are suitable when photographing is done by the use of the self-timer function or the automatic photographing function.

An image taking system of the present invention comprises an image taking means which takes an image by an image taking to generate image data on the image, an objective body detecting means which detects a predetermined objective body from image data, an exposure determination means which determines the exposure conditions according to result of detection of a predetermined objective body, a focusing means which determines the focusing position according to result of detection of a predetermined objective body, an image taking instructing means which instructs to an image taking means to take a running image according to exposure conditions and a focusing position, respectively determined by the exposure determination means and, the focusing means, and a self-timer means which permits taking a running image after a predetermined time from instruction of an image taking designating means, and/or an automatic image taking means which permits taking the running image at a predetermined timing, wherein the improvement comprises in that when a running image is to be taken by the use of a self-timer means or an automatic image taking means, exposure conditions and a focusing position are determined according to result of detection of a predetermined objective body at least once between the time when instruction to take a running image is done by an image taking instructing means and the time when the running image is actually taken.

In the image taking system of the present invention, when a running image is to be taken by the use of a self-timer means, exposure conditions and a focusing position may be determined by an exposure determination means and a focusing means according to result of detection of an objective body at least once a predetermined time after instruction to take a running image is done by an image taking instructing means.

In the image taking system of the present invention, when a running image is to be taken by the use of the self-timer means, exposure conditions and a focusing position may be determined by an exposure determination means and a focusing means according to result of detection of the predetermined objective body at least once during a predetermined time from the time when instruction to take the running image is done by an image taking instructing means.

In the image taking system of the present invention, when a running image is to be taken by the use of a self-timer means or an automatic image taking means, exposure conditions and/or a focusing position may be determined by a exposure determination means and a focusing means irrespective of result of detection of an objective body when a running image is taken in response to instruction by an image taking instructing means.

In the image taking system of the present invention, when a running image is to be taken by the use of a self-timer means, exposure conditions and a focusing position may be determined by an exposure determination means and a focusing means according to result of detection of the objective body at least once at a predetermined time during a predetermined time from the time when instruction to take the running image is done by an image taking instructing means.

In the image taking system of the present invention, exposure conditions and a focusing position may be determined by an exposure determination means and a focusing means when a plurality of object bodies are detected by an objective body detecting means or a predetermined time thereafter.

In the image taking system of the present invention, it is preferred that when a objective body is detected by an objective body detecting means, a focusing position be determined in an area of the objective body by a focusing means, while when an objective body is not detected by an objective body detecting means, a focusing position be determined in a predetermined area by a focusing means.

In the image taking system of the present invention, it is preferred that when a first focusing position is determined by a focusing means before an image taking instructing means instructs to the image taking means to take a running image, a first focusing position is determined in an area of the objective body by a focusing means when a predetermined objective body is detected by an objective body detecting means, and when an image taking instructing means instructs to the image taking means to take a running image, after a first focusing position is determined, a second focusing position is determined by a focusing means when a predetermined objective body is detected by an objective body detecting means after a first focusing position is determined while when an image taking instructing means instructs to the image taking means to take a running image, after a first focusing position is determined, a focusing position is not determined by a focusing means when a predetermined objective body is not detected by an objective body detecting means after a first focusing position is determined.

The image taking system of the present invention may be further provided with a mode selecting means for selecting a particular image taking mode and executing the same, and when a particular image taking mode is selected by way of a mode selecting means to take a running image by the use of a self-timer means or an automatic image taking means, exposure conditions and/or a focusing position may be determined according to result of detection of a predetermined objective body by an exposure determination means and/or a focusing means between the time when instruction to take the running image is done by an image taking instructing means and the time when the running image is actually taken.

In the image taking system of the present invention, it is preferred that a particular image taking mode be self-photographing mode where an image of user himself (herself) is taken or face detection-using image taking mode where the objective body is a face.

The image taking system of the present invention may be arranged so that when a running image is to be taken by the use of a self-timer means or an automatic image taking means only by selecting a particular image taking mode by way of a mode selecting means, exposure conditions and/or a focusing position may be determined by an exposure determination means and a focusing means according to result of detection of an objective body in response to instruction to take the running image from an image taking instructing means.

Further, the image taking system of the present invention may be arranged so that when a running image is to be taken by the use of a self-timer means or an automatic image taking means, exposure conditions and/or a focusing position may be determined by an exposure determination means and a focusing means after objective bodies detected by an objective body detecting means increases in number.

Further, the image taking system of the present invention may be arranged so that when a running image is to be taken by the use of a self-timer means or an automatic image taking means, exposure conditions and/or a focusing position may be determined by an exposure determination means and a focusing means a predetermined time after objective bodies detected by an objective body detecting means increases in number.

Further, the image taking system of the present invention may be arranged so that when a running image is to be taken by the use of a self-timer means or an automatic image taking means, exposure conditions and/or a focusing position may be determined by an exposure determination means and a focusing means after objective bodies detected by an objective body detecting means increases in number and result of detection of an objective body is stabilized. In this specification, "after result of detection of an objective body is stabilized" means when the amount of fluctuation of detected objective bodies becomes smaller than a predetermined threshold value.

In accordance with the present invention, there is further provided with a second image taking system comprising an image taking means which takes an image by an image taking to generate image data on the image, an objective body detecting means which detects a predetermined objective body from an image data, an exposure determination means which determines the exposure conditions according to result of detection of a predetermined objective body, a focusing means which determines the focusing position according to result of detection of a predetermined objective body, an image taking instructing means which instructs to the image taking means to take a running image according to the exposure conditions and the focusing position, respectively determined by the exposure determination means and, the focusing means, and a self-timer means which permits taking the running image after a predetermined time from instruction of an image taking designating means, and/or an automatic image taking means which permits taking the running image at a predetermined timing, wherein the improvement comprises in that when the running image is to be taken by the use of a self-timer means and an automatic image taking means, the timing at which the exposure conditions and/or the focusing position are determined according to result of detection of a predetermined objective body can be arbitrarily determined by the user.

Further, the image taking system of the present invention may be further provided with a setting means which sets detecting conditions by the objective body detecting means to a condition where one of a plurality of objective bodies in different states is detected and/or a selection means for selecting one of a plurality of objective bodies in different states detected by the objective body detecting means.

Further, the image taking system of the present invention is preferred that setting by the setting means or selection by the selection means be done when a running image is taken by the use of a self-timer means or an automatic image taking means.

Setting by the setting means or selection by the selection means be done either automatically or manually, and when setting by the setting means or selection by the selection means is automatically done, the objective body in the state determined in advance can be detected or selected automatically in response to selection of the self-timer photographing and the automatic photographing. When setting by the setting means or selection by the selection means is manually done, for instance, a plurality of detecting conditions may be displayed in the display such as a liquid crystal screen so that the user can arbitrarily select therefrom, or a plurality of frames surrounding a plurality of objective bodies in different states so that the user manually select only the frame that surrounds an objective body desired by the user.

Further, it is preferred that the "a plurality of objective bodies in different states" be a plurality of objective bodies which are different in orientations, in sizes, or in inclinations.

Further, it is preferred that the selection means does not select the objective body the amount of fluctuation of which is larger than a predetermined value. Here, "the amount of fluctuation" means, for instance, the amount of movement of position of the objective body, the amount of fluctuation of size of the objective body or the rate of change of the orientation of the objective body.

Further, when a running image is to be taken by the use of a self-timer means, setting by the setting means or selection by the selection means may be done at a predetermined time during a predetermined time.

Further, setting by the setting means or selection by the selection means may be arranged to be able to be done arbitrarily by the user.

The image taking system of the present invention is preferred to be further provided with a transmission means transferring to the user that a predetermined objective body is not detected yet when the predetermined objective body is not detected. This transmission means may transfer to the user that a predetermined objective body is detected when the predetermined objective body is detected.

The image taking system of the present invention is preferred to be provided with a plurality of transmission means and one of the transmission means can be arbitrary selected or set by the user.

In accordance with the present invention, since when a running image is to be taken by the use of a self-timer means or an automatic image taking means, exposure conditions and a focusing position are determined according to result of detection of a predetermined objective body at least once between the time when instruction to take a running image is done by an image taking instructing means and the time when the running image is actually taken, when an objective body is detected after the time when instruction to take a running image is done by an image taking instructing means, exposure conditions and/or a focusing position can be determined in an area of the objective body. With this arrangement, even if an image of user himself (herself) is taken, that is, the user himself (herself) is an objective body, there can be obtained a picture where the user himself (herself) is in a suitable brightness and in focus.

BRIEF DESCRIPTION OF THE DRAWINGS

FIG. 6A is a part of a view showing a flowchart for illustrating the second processing of the self-timer photographing, FIG. 6B is the other part of a view showing a flowchart for illustrating the second processing of the self-timer photographing, FIG. 7B is the other part of a view showing a flowchart for illustrating the third processing of the self-timer photographing, FIG. 19B is the other part of a view showing a flowchart for illustrating the sixth processing of the self-timer photographing.

DESCRIPTION OF THE PREFERRED EMBODIMENT

Embodiments of the present invention will be described with reference to the drawings, hereinbelow. Though, digital cameras will be described in the following embodiments, application of the present invention need not be limited to the digital cameras but may be, other electronic instruments provided with an electronic imaging function such as a mobile phone with a camera or a PDA with a camera.

Figure 1:
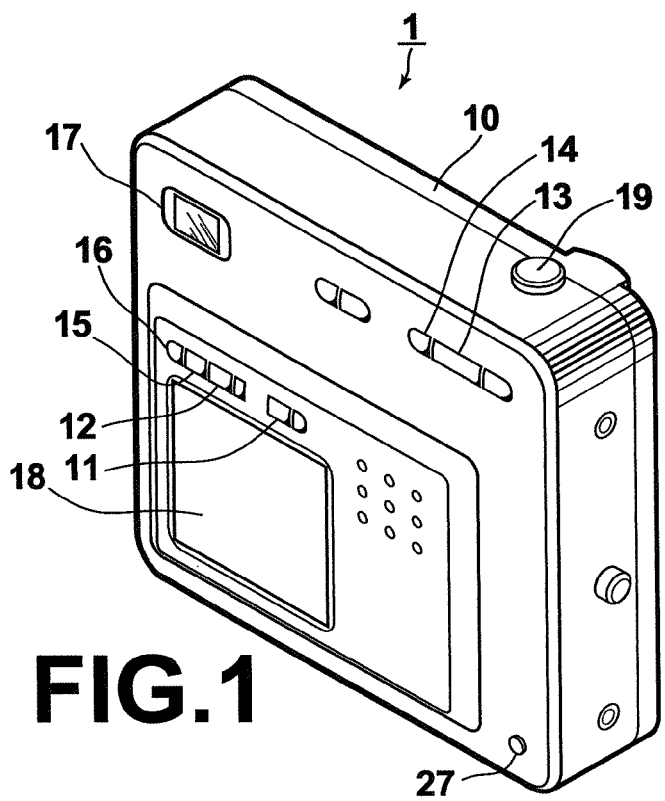
FIG. 1 is a perspective view showing a first digital camera as viewed from rear.
Figure 2:
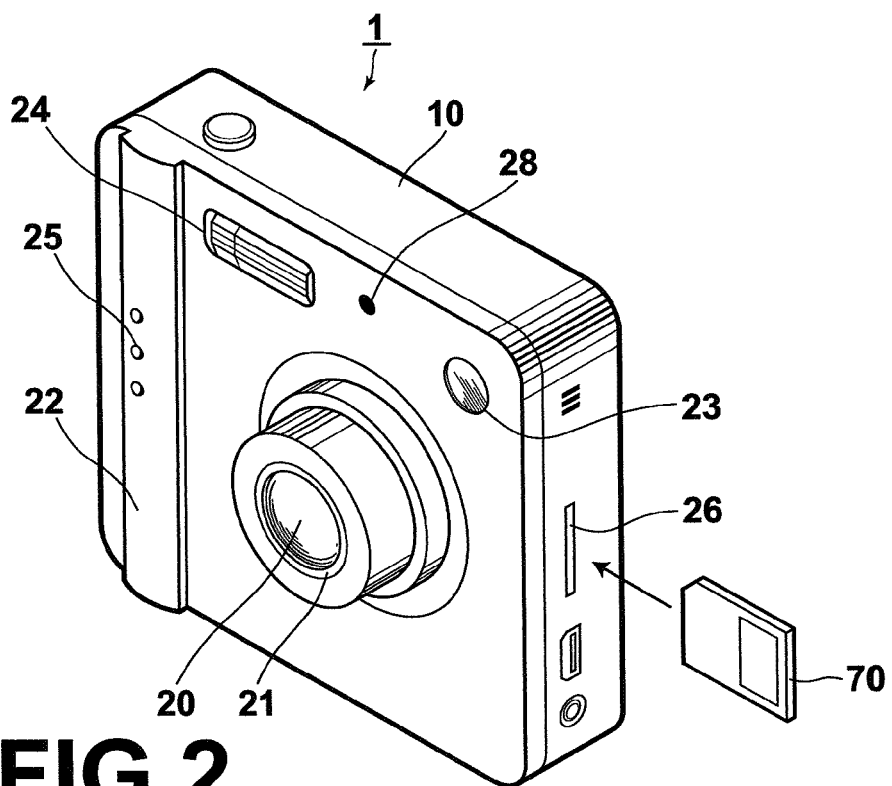
FIG. 2 is a perspective view showing the first digital camera as viewed from front.

FIGS. 1 and 2 show an example of the digital camera as viewed from rear and the front. As shown in FIG. 1, as an interface for control by the photographer, an action mode switch 11, a menu/OK button (input means) 12, a zoom up and down lever 13, a right and left button 14, a back (return) button 15 and a display switching button 16 are provided on the rear surface of the body of the digital camera 1. The digital camera 1 is further provided with a finder 17 for image taking and a liquid crystal monitor 18 and a shutter release button 19 (an image taking instructing means) for image taking and for reproduction and a face detecting button 27.

The action mode switch 11 is a slide switch for switching the action modes between a still image taking mode, an animation taking mode and a reproduction mode.

The menu/OK button 12 is a button for displaying on the monitor 18 various menus for setting the image taking mode, a strobe lighting mode, ON and OFF of the self-timer, recording pixel number or sensitivities each time it is depressed, and for selection/setting on the basis of the menu displayed on the monitor 18.

When the zoom/up and down lever 13 is inclined up and down, tele/wide of the camera 1 is adjusted when an image is to be taken and the cursor displayed in the menu screen displayed on the monitor 18 is moved up and down when various values are set. The right and left button 14 is a button for moving right and left the cursor in the menu screen displayed on the monitor 18 when various values are set.

When the back (return) button 15 is depressed, setting of the various values is interrupted, and the processing is returned to the preceding screen displayed on the monitor 18. The display switching button 16 is a button for switching ON and OFF of the display on the monitor 18, various guidance messages, ON and OFF of the character display when depressed. The finder 17 is viewed when taking an image to obtain a desired composition of a picture and to bring the object into focus. The image of the object viewed through the finder 17 is displayed on the finder window 23 provided in the front face of the camera body 10. The face detecting button 27 is a button for switching ON and OFF of the face detection by a face detecting portion to be described later.

The contents set by the control of the button or the lever can be recognized through, for instance, the display on the monitor 18, the lamp in the finder, or the position of the slide lever. Further, the monitor 18 displays a through image for confirming the object when taking an image. With this arrangement, the monitor 18 displays a still image and an animation after photographing and various menus as well as functions as an electronic viewfinder. When the shutter release button 19 is semi-depressed, an AE processing and an AF processing to be described later are carried out and when the shutter release button 19 is full-depressed, an image is taken on the basis of data output through the AE processing and the AF processing, and the image displayed by the monitor 18 is recorded as the taken image.

As shown in FIG. 2, a taking lens 20, a lens cover 21, a power switch 22, the finder window 23, a strobe light 24, a self-timer lamp 25 and an AF auxiliary light 28 are provided on the front surface of the camera body 10. A medium slot 26 is provided on the side surface of the camera body 10.

The taking lens 20 is for imaging an image of the object on a predetermined imaging surface (e.g., a CCD inside the camera body 10) and comprises a focusing lens, a zoom lens and the like. The lens cover 21 covers the surface of the taking lens 20, for instance, when the power source of the digital camera 1 is off or when the digital camera 1 is in the reproduction mode, to protect the taking lens 20 from stain, dirt and the like.

The power switch 22 turns on and off the power source of the digital camera 1. The strobe light 24 momentarily irradiates the object with a necessary amount of light while the shutter release button 19 is depressed and the shutter in the camera body 10 is opened. The self-timer lamp 25 is for informing the object of the shutter open/close timing, i.e., the start and the end of the exposure, when an image is taken with the self-timer.

The AF auxiliary light 28 comprises, for instance, an LED, and is for making easy to execute AF processing to be described later by projecting light narrowed in the range which it covers, that is throttled light onto the object for a long time. The medium slot 26 is a port in which an external recording medium 70 such as a memory card is loaded, and when the external recording medium 70 is loaded therein, read-out or write-in of data is carried out.

Figure 3:
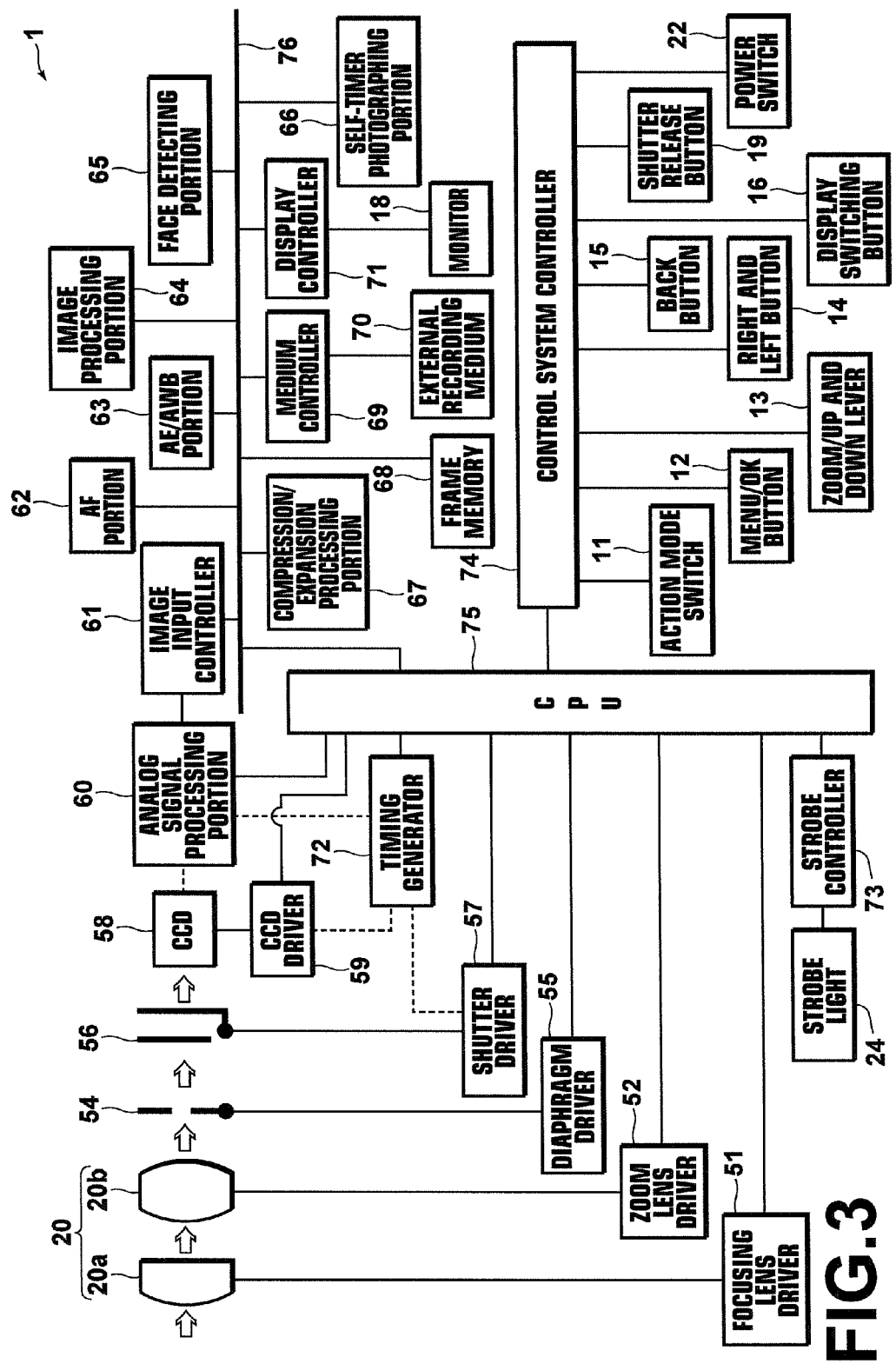
FIG. 3 is a block diagram showing structure of the first digital camera.

FIG. 3 is a block diagram showing functions of the digital camera 1. As shown in FIG. 3, as the control system of the digital camera 1, there are provided the action mode switch 11, the menu/OK button 12, the zoom/up and down lever 13, the right and left button 14, back (return) button 15, the display switching button 16, the shutter release button 19, the power switch 22 and a control system control portion 74 which is an interface for transferring the contents of control of the elements described above to a CPU 75.

As the taking lens 20, a focusing lens 20*a* and a zoom lens 20*b* are provided. The lenses 20*a* and 20*b* are stepwise driven respectively by a focusing lens driver 51 and a zoom lens driver 52 comprising an electric motor and a motor driver to be moved in the direction of the optical axis. The focusing lens driver 51 stepwise drives the focusing lens 20*a* on the basis of focus driving amount data output from an AF portion 62. The zoom lens driver 51 stepwise drives the zoom lens 20*b* on the basis of data on the amount of control of the zoom/up and down lever 13.

A diaphragm 54 is driven by a diaphragm driver 55 comprising an electric motor and a motor driver. The diaphragm driver 55 adjusts the diameter of opening of the diaphragm 54 on the basis of diaphragm data output from an AE (automatic exposure)/AWB (automatic white balance) portion 63 (automatic exposure control means).

Shutter 56 is a mechanical shutter and is driven by a shutter driver 57 comprising an electric motor and a motor driver. The shutter driver 57 controls open/closure of the shutter 56 on the basis of a signal generated in response to depression of the shutter release button 19 and shutter speed data output from the AE/AWB portion 63.

Behind the optical system described above, a CCD 58 which is an image-taking element is provided. The CCD 58 has a photoelectric surface comprising a lot of light receiving elements arranged in matrix, and an image of the object passing through the optical system is imaged on the photoelectric surface to be photoelectrically converted. Forward of the photoelectric surface, there are disposed a micro-lens array (not shown) for collecting light on each of the pixels and a color-filter array (not shown) comprising a lot of red filters, green filters and blue filters which are regularly arranged. The CCD 58 outputs electric charges accumulated by the pixels line by line as image signals in synchronization with vertical and horizontal clock signals supplied from a CCD control portion 59. The electric charge accumulating time of each pixel, that is, the exposure time, is determined by an electronic shutter-drive signal given by the CCD control portion 59.

The image signals output from the CCD 58 are input into an analog signal processing portion 60. The analog signal processing portion 60 comprises a correlation double sampling circuit (CDS) for removing noise of the image signal, an auto-gain controller (AGC) for adjusting the gain of the analog signal and an A/D converter (ADC) for converting the image signals to digital image data. The digital image data is a CCD-RAW data having R, G, B density values by each of the pixels.

A timing generator 72 generates timing signals, and the timing signals are input into the shutter driver 57, the CCD control portion 59 and the analog signal processing portion 60 to synchronize operation of the shutter button 19, open and closure of the shutter 56, taking in of the electric charge of the CCD 58 and processing by the analog signal processing portion 60. A strobe control portion 73 controls the light emitting action of the strobe light 24.

An image input controller 61 writes, in a frame memory 68, the CCD-RAW data input from the analog signal processing portion 60. The frame memory 68 is a working memory for use when each of various digital image processing (signal processing) to be described later is to be carried out on the image data, and may comprise, for instance, an SDRAM (synchronous dynamic random access memory) which transfers data in synchronization with bus clock signals of a constant period.

A display control portion 71 is for displaying as a through image, on the monitor 18, image data stored in the frame memory 68 and integrates a brightness (Y) signal and a color (C) signal into a composite signal to output the composite signal to the monitor 18. The through image is taken at predetermined time intervals by the CCD 58 while the image taking mode is selected. Further, the display control portion 71 permits to display an image, on the monitor 18, based on image data included in an image file stored in the external recording medium 7 and read out by a medium control portion 69.

The face detecting portion 65 detects the face of a human from image data stored in the frame memory 68 that is the through image. Specifically, the face detecting portion 65 detects as a face area the area having features of the face included in the face (for instance, has a skin color, has eyes, or has a contour of the face, or the like). However, the face detecting portion 65 need not be limited to such a structure. When the face detecting button 27 is set ON, the face detecting portion 65 normally detects the face of a human from the through image. In the present invention, the face detecting portion 65 may be formed by soft-ware or integrated alone.

The AF portion (focusing means) 62 detects the focusing position on the basis of result of detection of the face detected from the image data by the face detecting portion 65 and outputs focusing-lens drive amount data (AF processing). As the method of detecting the focusing point in this embodiment, a passive system where the focusing point is detected on the basis of a feature that the contrast of an image increases when the image is in focus is applied.

The AE/AWB portion (exposure determining means) 63 measures the brightness of the object on the basis of result of detection of the face detected from the image data by the face detecting portion 65 and determines diaphragm value and shutter speed on the basis of the measured brightness of the object, thereby outputting the diaphragm value data and shutter speed data (AE processing) while automatically adjusts white balance (AWB processing) upon image-taking.

An image processing portion 64 carries out the image quality corrections such as a γ correction, a sharpness correction and a contrast correction on the image data of the running image, and carries out YC processing where the CCD-RAW data is converted to YC data comprising Y data which is a brightness signal, Cb data which is a blue difference signal and Cr data which is a red difference signal. This "running image" is an image based on image data which is stored in the frame memory 68 by way of the analog signal processing portion 60 and the image input controller 61 after an image signal is output from the CCD 58 in response to full-depression of the shutter release button 19.

Though the upper limit of the number of pixels of the "running image" is governed by the number of pixels of the CCD 58, the number of pixels used in the recording can be changed, for instance, by the user's setting an image quality (fine, normal and the like). On the other hand, the number of pixels of the through image and/or a pre-image may be smaller than that of the running image, for instance, about $\frac{1}{16}$ thereof. The pre-image is based on image data stored in the frame memory 68 as a result from the CPU's causing the CCD 58 to execute pre-photographing upon receipt of a semi-depression signal generated in response to semi-depression of the shutter release button 19.

The self-timer image-taking portion (self-timer photographing means) 66 is provided with a timer system (not shown) which measures lapse of a predetermined waiting time (e.g., 5 seconds from full-depression of the shutter release button 19) from full-depression of the shutter release button 19 to the time that a running image is actually taken, and controls the system through the timing generator 72 so that a depression signal of the shutter release button 19 is output to the shutter drive portion 57 when the timer system measures 0. The self-timer lamp 25 is blinked during the waiting time for informing the photographer or the like of the start of the exposure. The ON/OFF of the self-timer by the self-timer image-taking portion 66 may be selected on the selection screen on the monitor 18 or may be set by providing a self-timer timer button on the rear surface of the camera body 10.

A compression/expansion processing portion 67 compresses, for instance, in JPEG format, the image data of the running image which has been processed with the correction and the conversion by the image processing portion 64 and generates an image file. To this image file, a tag in which information such as photographing date is stored on the basis of the format or the like is attached. This compression/expansion processing portion 67, in a reproduction mode, reads out the compressed image file from the external recording medium 70 and expands it. Expanded image data is output to the display control portion 71 and the display control portion 71 displays an image on the basis of the image data on the monitor 18.

The medium control portion 69 corresponds to a medium slot 26 in FIG. 2 and controls read and write of the image file and the like stored in the external recording medium 70.

The CPU 75 controls each element of the digital camera 1 according to control of the various buttons, levers and switches, and signals from the various function blocks. Further, a data bus 76 is connected to the image input controller 61, each of the processing portions 62 to 64 and 67, the face detecting portion 65, the self-timer image-taking portion 66, the frame memory 68, the various control portions 69, 71, and the CPU 75, and each of the pieces of data such as the digital image data is transmitted and received by way of the data bus 76.

Figure 4:
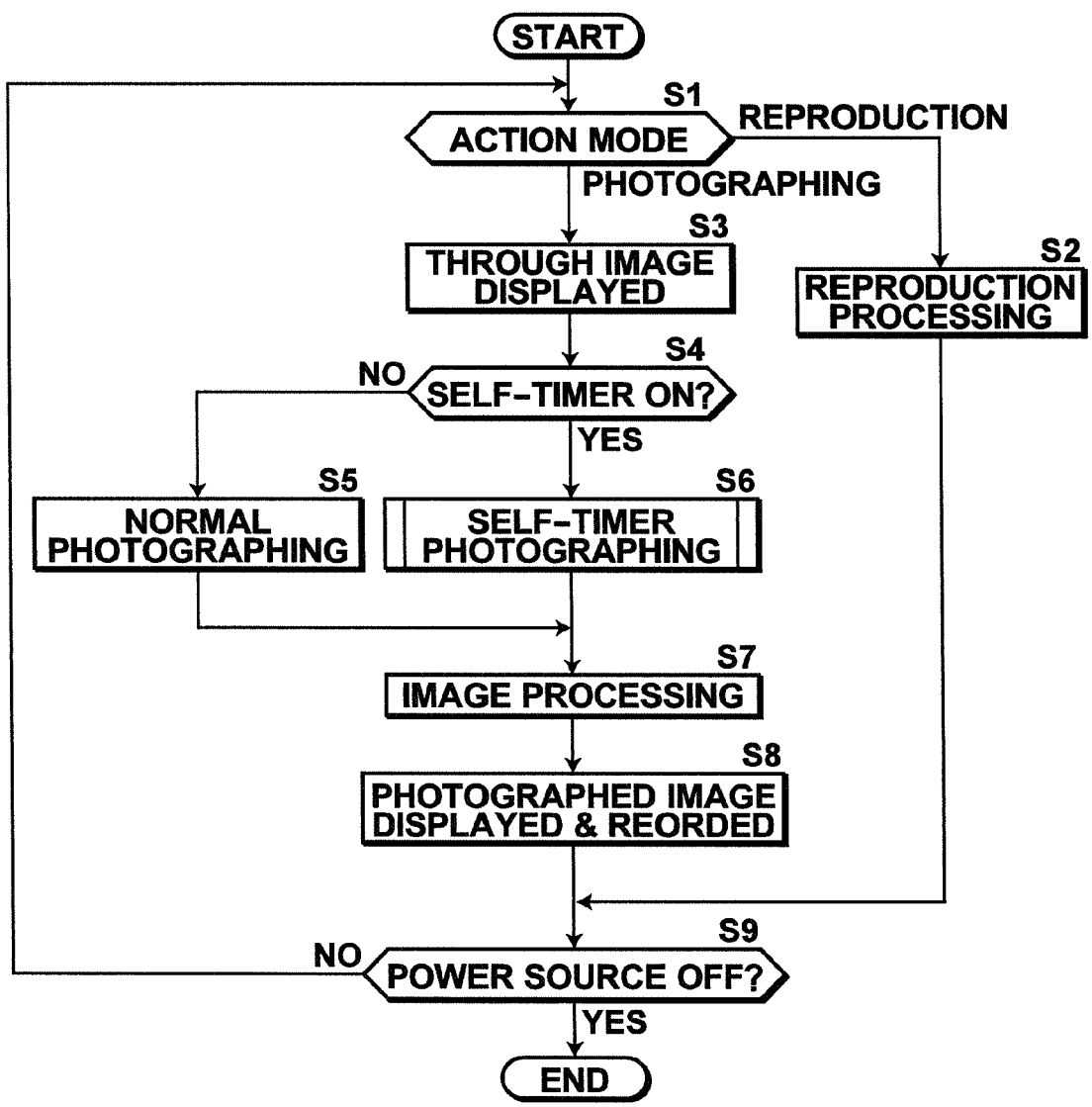
FIG. 4 is a view showing a flowchart for illustrating processing of the self-timer photographing.

An operation of the digital camera 1 when taking an image will be described, hereinbelow. FIG. 4 shows a flowchart of a series of processing in the digital camera 1. As shown in FIG. 4, the CPU 75 first determines whether the working mode of the digital camera 1 is the image taking mode or the reproduction mode according to the setting of the action mode switch 11 (step S1). When it is determined that the working mode is the reproduction mode, the reproduction is carried out (step S2), where the medium control portion 69 reads out the image file stored in the external recording medium 70 and displays on the monitor 18 an image on the basis of the image data in the data file. After the reproduction is ended, the CPU 75 determines whether the power source of the digital camera 1 is off (step S9) and when the power source of the digital camera 1 has been turned off (step S9:YES), the CPU 75 breaks the power source of the digital camera 1 and ends the processing. When the power source of the digital camera 1 has not been turned off (step S9:NO), the CPU 75 shifts its processing to step S1.

On the other hand, when it is determined in step S1 that the working mode is the image-taking mode, the CPU 75 displays a though image. Displaying a though image is a processing to display on the monitor 18 an image based on image data stored in the frame memory 68. Then the CPU 75 determines whether the self-timer is ON (step S4). When the self-timer is not ON (step S4:NO), normal image taking is carried out (step S5), where image taking of a running image is started upon depression of the shutter release button 19. When the self-timer is ON (step S4:YES), the CPU 75 permits the self-timer photographing portion 66 to carry out the self-timer photographing (step S6).

Figure 5:
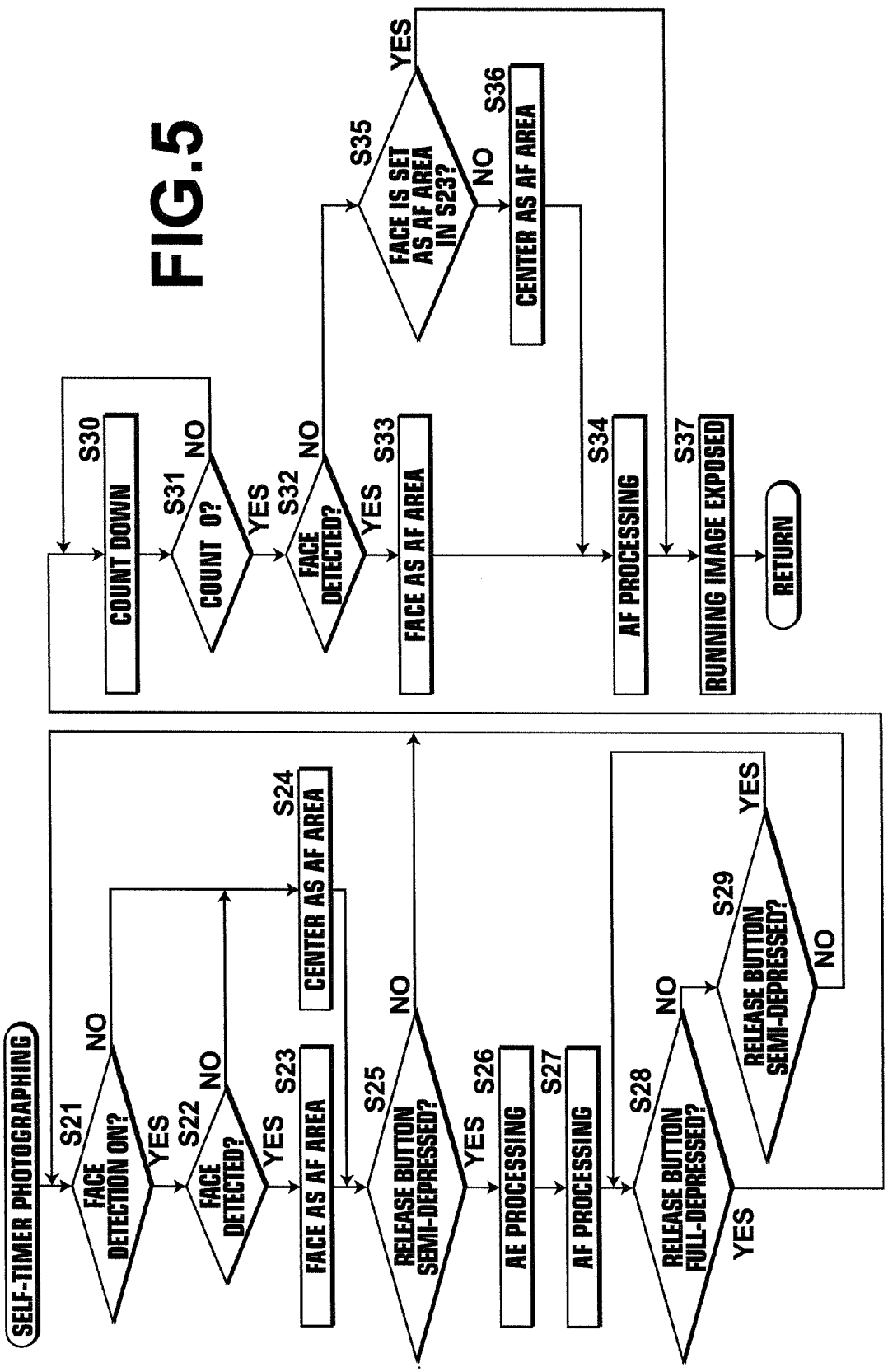
FIG. 5 is a view showing a flowchart for illustrating second processing of the self-timer photographing.

FIG. 5 shows a flowchart for illustrating operation of the camera 1 when the self-timer image-taking is carried out. As shown in FIG. 5, the CPU 75 first determines whether the face detecting button 27 is ON (step S21). When the face detecting button 27 is not ON (step S21:NO), after instructing the center of the object as the focusing area, or the AF area (step S24), the CPU 75 shifts its processing to step S25. On the other hand, when the face detecting button 27 is ON (step S21: YES), the face detecting portion 65 normally detects the face in the image data stored in the frame memory 68 in parallel to the flow of operation of the camera 1 when the self-timer image-taking is carried out.

Then the CPU 75 determines whether a face has been detected (step S22). When a face has been detected (step S22:YES), the CPU 75 instructs the area of the face as the AF area while the CPU 75 instructs the center of the object as the AF area when a face has not been detected (step S22:NO).

Then the CPU 75 determines whether the shutter release button 19 is semi-depressed (step S25). The CPU 75 shifts its processing to step S21 when a face has not been detected (step S25:NO). While when a face has been detected (step S25: YES), the AE/AWB processing portion 63 carries out the AE processing on the basis of the result of detection whether a face has been detected (step S26). Though may be carried out on the basis of the same area as the AF area determined in step S23 or step S24 at this time but the AE processing need not be limited thereto. Then, the AF processing portion 62 carries out the AF processing on the basis of the AF area determined in step S23 or step S24 (step S27).

Then the CPU 75 determines whether the shutter release button 19 is full-depressed (step S28). When the shutter release button 19 is not full-depressed (step S28:NO), the CPU 75 further determines whether the shutter release button 19 is semi-depressed (step S29). When the shutter release button 19 is not semi-depressed (step S29:NO), the CPU 75 shifts its processing to step S21. When the shutter release button 19 is semi-depressed (step S29:YES), the CPU 75 shifts its processing to step S28. When the shutter release button 19 is full-depressed (step S28:YES), the timer system of the self-timer photographing portion 66 is started to measure lapse of the predetermined waiting time to the time that a running image is actually taken, or is started to count down (step S30).

Then the CPU 75 determines whether the waiting time becomes 0 or the count reaches 0 (step S31). When the count is not 0 (step S31:NO), the CPU 75 shifts its processing to step S30. While when the count is 0 (step S31:YES), the CPU 75 determines whether a face has been detected (step S32).

When a face has been detected (step S32:YES), the CPU 75 instructs the area of the face as the AF area (step S33) while the CPU 75 determines (step S35) whether the area of the face has been set as the preceding AF area, that is, whether the area of the face has been set as the AF area in step S23 when a face has not been detected (step S32:NO). When the area of the face has not been set as the AF area in step S23 (step S35:NO), the CPU 75 sets the center of the object as the AF area (step S36). When the AF area is set in step S33 or step S36, the AF processing is carried out on the basis of the set AF area (step S34), a running image is started to be exposed (step S37). When the area of the face has been set as the AF area in step S23, a running image is directly started to be exposed without the AF processing (step S37).

Though, in this embodiment, only the AF processing (step S34) is carried out immediately before the running image-taking, the present invention need not be limited to this arrangement, but the AE processing may be done before step S34.

Determination in step S32, where whether a face has been detected is determined by the CPU 75, is carried out only when the face detecting button 27 is ON (step S21:YES), and when the face detecting button 27 is OFF (step S21:NO), the CPU 75 determines the center of the object as the Af area when the shutter release button 19 is semi-depressed in step S25 (step S25:YES), while when the count is 0 in step S31 (step S30:YES), a running image is directly started to be exposed without the AF processing (step S37). At this time, the AF processing where the center of the object is determined to be the Af area need not be limited to when the shutter release button 19 is semi-depressed but may be, for instance, when the count is 0 in step S31.

Then, when a running image is exposed (step S37), the running image obtained by the running image-taking is image-processed by the image processing portion 64 as shown in FIG. 4 (step S7). At this time, the running image processed by the image processing portion 64 may be compressed by the compression/expansion processing portion 67 to generate an image file.

Then the CPU 75 displays the running image processed by the image processing portion 64 and records the same on the external recording medium 70 (step S8). Thereafter, the CPU 75 determines whether the power switch 22 has been operated to turn off the power (step S9). When the power switch 22 has been operated to turn off the power (step S9:YES), the power of the digital camera 1 is turned off and the processing is ended. When the power switch 22 has not been operated to turn off the power (step S9:NO), the processing is shifted to step S1 and the processing represented by step S1 and the following steps are repeated. Thus, the image taking by the digital camera 1 is done.

Examples of the AF processing are shown in the following tables 1 and 2.

TABLE 1

| | | when release button is semi-depressed | | immediately before exposure | |
|---|---|---|---|---|---|
| | | result of detection | AF processing | result of detection | AF processing |
| 1 | | detected(face F1) | AF(F1 as AF area) | detected(face F2) | re-AF(F2 as AF area) |
| 2 | | NON-DETECTED | AF(center as AF area) | detected(face F2) | re-AF(F2 as AF area) |
| 3-1 | | detected(face F1) | AF(F1 as AF area) | NON-DETECTED | re-AF is not done |
| 3-2 | | detected(face F1) | AF(F1 as AF area) | NON-DETECTED | re-AF(center as AF area) |

TABLE 1-continued

| | when release button is semi-depressed | | immediately before exposure | |
|---|---|---|---|---|
| | result of detection | AF processing | result of detection | AF processing |
| 4-1 | NON-DETECTED | AF(center as AF area) | NON-DETECTED | re-AF(center as AF area) |
| 4-2 | NON-DETECTED | AF(center as AF area) | NON-DETECTED | re-AF is not done |

TABLE 2

| | immediately before exposure | |
|---|---|---|
| | result of detection | AF processing |
| 1 | detected(face F2) | AF(F2 as AF area) |
| 2 | NON-DETECTED | AF(center as AF area) |

Though, the AF processing of this embodiment is carried out by setting the AF areas as shown in 1, 2, 3-1 and 4-1 of table 1 as described above in conjunction with FIG. 5, this invention need not be limited to such an arrangement but, for instance, the center of the object as the AF area may be set as shown in 3-2 of table 1 and the AF processing may be carried out again instead of carrying out no AF processing again as shown in 3-1 of table 1 when no face has been detected in step S32 after carrying out the AF processing in step S27 of FIG. 5 by setting the AF area as the area of the face. Further, when no face has been detected in step S32 after carrying out the AF processing in step S27 of FIG. 5 by setting the AF area as the center of the object, for instance, the AF processing need not be carried out as shown in 4-2 of table 1 instead of carrying out the AF processing again as shown in 4-1 of table 1 by setting the AF area as the center of the object.

Though, in this embodiment, the AF processing is carried out when the shutter release button 19 is semi-depressed and immediately before exposure of a running image, this invention need not be limited to such an arrangement but, for instance, the AF processing may be carried out only immediately before exposure of a running image. In this case, when the CPU 75 determines that a face has been detected immediately before exposure of a running image as shown in table 2, the CPU 75 carries out the AF processing by setting the AF area as the area of the face while when the CPU 75 determines that a face has not been detected, the CPU 75 carries out the AF processing by setting the AF area as the center of the object. The "immediately before exposure of a running image" means the time when the shutter release button 19 is full depressed and a time between the shutter release button 19 is full depressed and the running image is exposed.

Though, in this embodiment, the AE processing and/or the AF processing are carried out at the timing described above, this invention need not be limited to such an arrangement but, for instance, the AE processing and/or the AF processing may be carried out after the number of the objective body is increased. In the self-timer photographing, it is often the case that the photographer himself or herself is an object. In this case, the photographer cannot be in the field of coverage when the shutter release button 19 is full depressed but can be in the field of coverage immediately before exposure of the running image.

Accordingly, by always confirming the number of faces detected by the face detecting portion 65 and by determining that the photographer himself or herself is in the field of coverage when the number of faces increases, the AE processing and/or the AF processing are carried out. FIGS. 6A and 6B show a flowchart of the self-timer photographing when the AE processing and/or the AF processing are carried out after the number of faces increases. Since processing in FIG. 6A is the same as the processing shown in FIG. 5 up to steps S29, the steps analogous to those shown in FIG. 5 are given the same reference numerals and are not described.

When the shutter release button 19 is full depressed in step S28 as shown in FIG. 6A, the face detecting portion 65 of the CPU 75 confirms the number A of faces detected by the face detecting portion 65 (step S121), then the timer system of the self-timer photographing portion 66 is started to count down (step S122) as shown in FIG. 6B.

After count down is started, the CPU 75 checks the number B of faces detected by the face detecting portion 65 (step S123). Then the CPU 75 determines whether the number of faces detected by the face detecting portion 65 increases from before the count down, that is, whether B>A (step S124).

When the number of faces detected by the face detecting portion 65 increases from before the count down (step S124: YES), the CPU 75 determines the face on which the photographing conditions such as the AF are focused, and sets the area of this face as the AF area (step S125) and the AF processing portion 62 carries out the AF processing on the basis of the set AF area (step S126). The CPU 75 thereafter determines whether the count reaches 0 (step S127). When the count reaches 0 (step S127:YES), a running image is exposed on the basis of the data output from the AF processing portion 62 in step S126 (step S128).

When the count is not 0 (step S127:NO), the CPU 75 continues the count down until the count reaches 0 (step S129), and when the count reaches 0, the CPU 75 shifts its processing to step S128 and a running image is exposed (step S128).

When the number of faces detected by the face detecting portion 65 does not increase from before the count down (step S124:NO), the CPU 75 carries out the same processing as the steps S31 to S36 in FIG. 5 and a running image is exposed (step S128).

The face detection by the face detecting portion 65 and the count down by the self-timer image-taking portion 66 are carried out during steps S122 to S128, that is, in parallel to the processing denoted by S' in FIG. 6B. Further, when the count reaches 0 before the AF processing in step S126 or S34 in S' in FIG. 6B is completed, the count down may be ended and a running image may be exposed (step S128) on the basis of data output by the AF processing portion 62 in the preceding AF processing or in preceding step S27.

Though the AF processing only is carried out in step S126 or S34, the present invention need not be limited to this arrangement but the AE processing may be carried out prior to the AF processing.

By thus carrying out a running image taking, for instance, when a photographer himself or herself is an object, an image where the photographing conditions such as the AF are focused on the photographer himself or herself can be obtained since the AF processing is carried out after the objective body increases, that is, after the photographer himself or herself goes into the field of coverage. When the AF processing is to be done after the count reaches 0, generally there is generated a slight time lag between the time at which the count reaches 0 and the time at which a running image is exposed. However, when the AF processing and/or the AE processing are carried out when the number of the face detected increases before the count reaches 0 as in this embodiment, it can be reduced the time which is required from when the count reaches 0 to when a running image is exposed and generation of said time lag can be prevented.

Further, in this embodiment, in the case where the photographer himself or herself is an object, when the photographer himself or herself enters the field of coverage, there is a fear that the face of the photographer is detected and the AF processing is done before the photographer goes to an intended position, whereby the photographed image is out of focus.

Figure 7A:
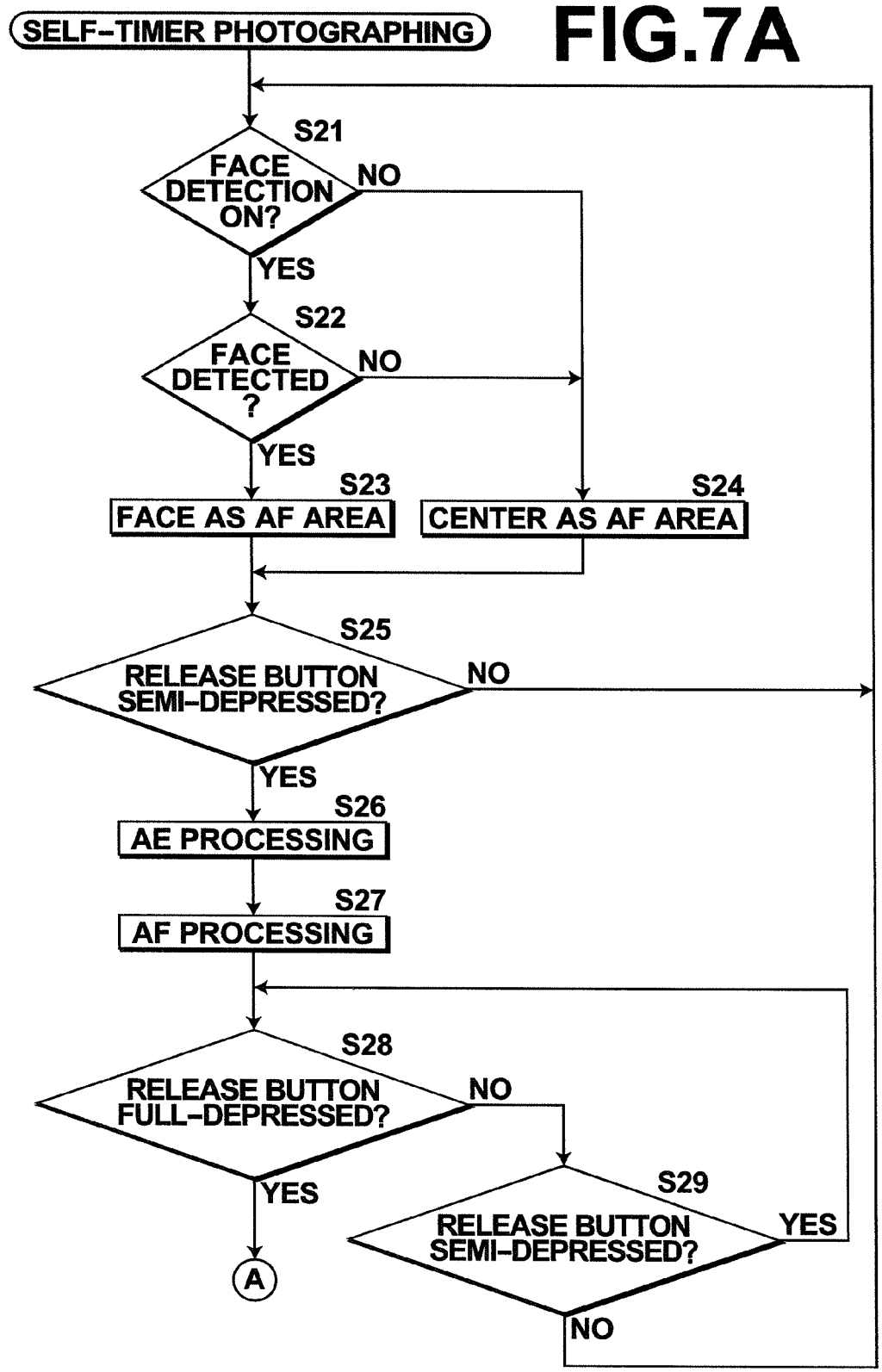
FIG. 7A is a part of a view showing a flowchart for illustrating the third processing of the self-timer photographing.

Accordingly, by constantly confirming the number of detected faces and after lapse of a predetermined time M from when the number of detected faces increases, determining that, for instance, the photographer himself or herself enters the field of coverage and movement of the photographer himself or herself is completed, the AE processing and/or the AF processing are done. FIGS. 7A and 7B show a flowchart for illustrating the processing of a self-timer photographing done after lapse of a predetermined time M from when the number of detected faces increases. In FIGS. 7A and 7B, the steps analogous to those in FIGS. 6A and 6B will be given the same reference numerals and will not be described, here.

As shown in FIG. 7B, after the CPU 75 determines whether the number of faces detected by the face detecting portion 65 increases from before the count down, that is, whether B>A (step S124), the CPU 75 sets 0 to k in order to measure the predetermined time M separately from the timer system of the self-timer photographing portion 66 (step S130). The value of the predetermined time M may be arbitrary set by the user.

Then the CPU 75 determines whether the predetermined lapses, or whether k>M (step S131). When it is determined that k>M (step S131:YES), the reference on which the photographing conditions such as AF is determined and the area of the face is set as the AF area (step S132) and the AF processing is done on the basis of set AF area (step S126).

When it is not determined in step S131 that k>M (step S131:NO), the CPU 75 whether the count of the timer system of the self-timer photographing portion 66 reaches 0 (step S133). When the count is 0 (step S133:YES), the CPU 75 shifts it processing to step S132. When the count is not 0 (step S133:NO), the CPU 75 shifts it processing to step S131 after incrementing k by 1 (step S134).

By thus carrying out the self-timer photographing, since the AE processing and/or the AF processing are done a predetermined time M after increase of the number of detected faces that is, after the photographer himself or herself enters the field of coverage and movement to the position intended by the photographer himself or herself is completed, an image where the photographing conditions such as the AF are surely focused on the photographer himself or herself and the photographer himself or herself is in focus can be obtained.

Further by doing the AE processing and/or the AF processing a predetermined time after increase of the number of detected fates, it can be reduced the time which is required from when the count reaches 0 to when a running image is exposed as described above and generation of said time lag can be prevented.

Figure 8A:
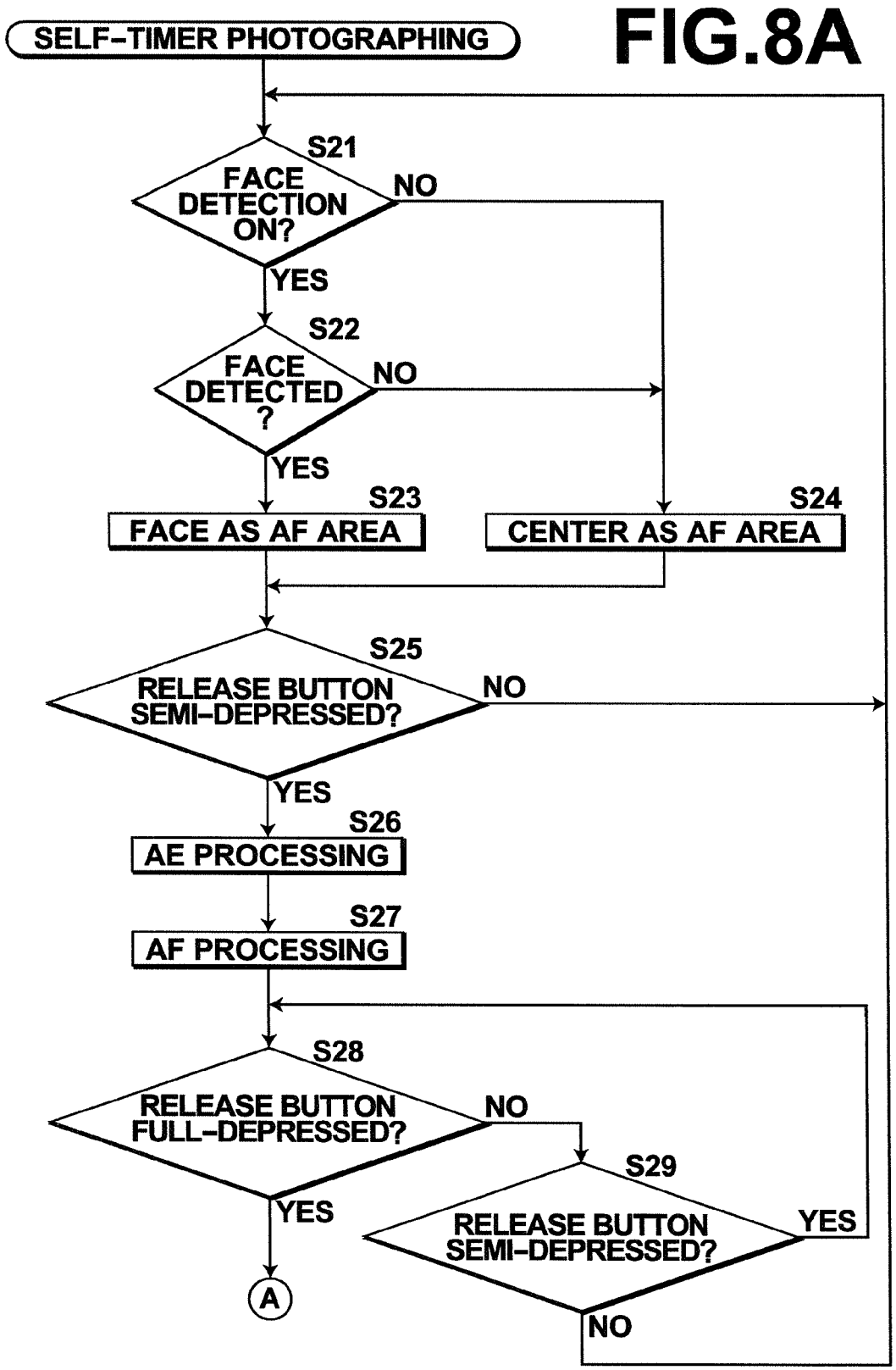
FIG. 8A is a part of a view showing a flowchart for illustrating the fourth processing of the self-timer photographing.
Figure 8B:
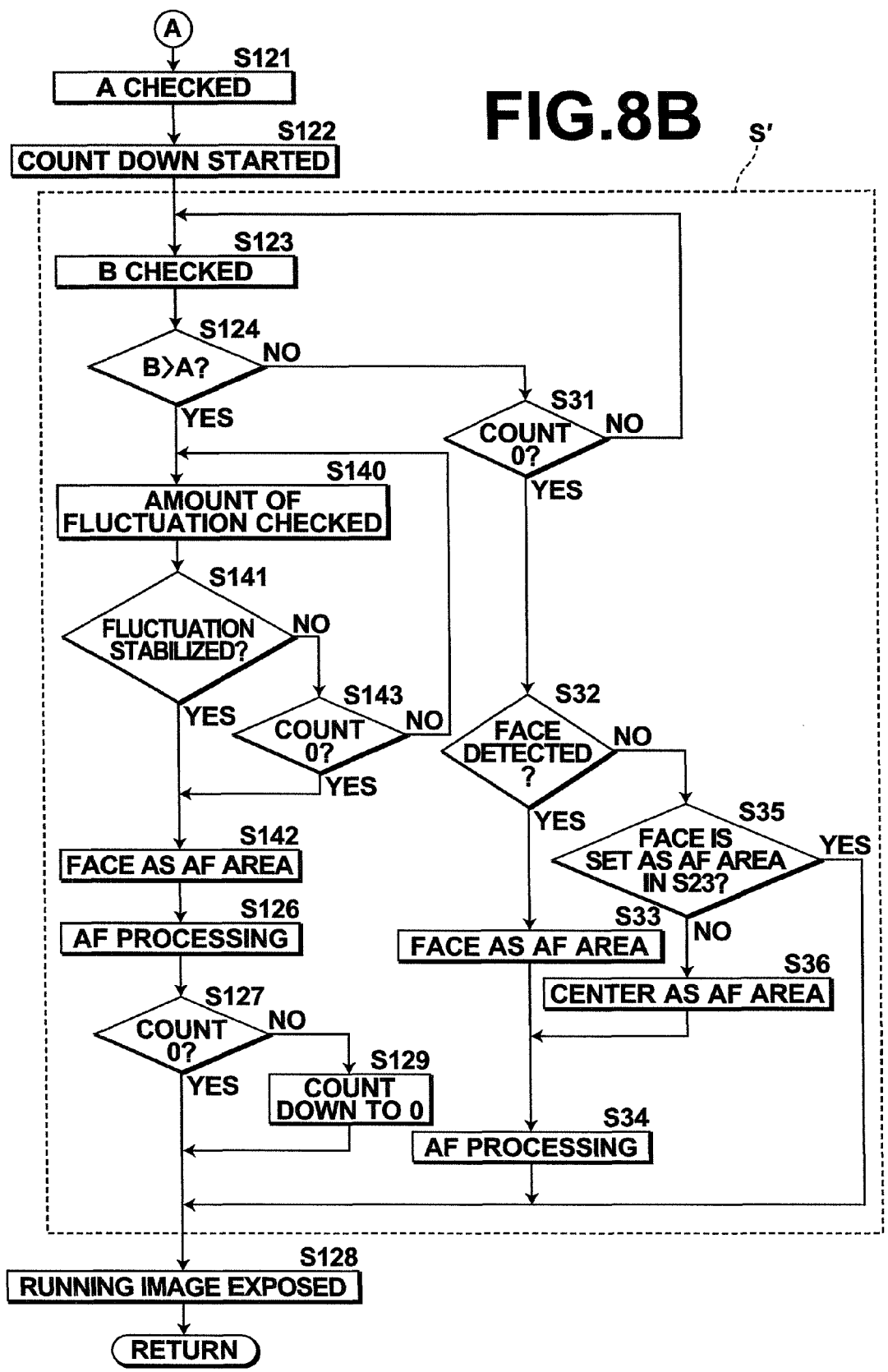
FIG. 8B is the other part of a view showing a flowchart for illustrating the fourth processing of the self-timer photographing.

The AE processing and/or the AF processing may be done by, for instance, determining that the photographer himself or herself enters the field of coverage and movement of the photographer himself or herself is completed when the number of detected faces increases and when the result of detection of face is stabilized by not determining so after lapse of a predetermined time M from when the number of detected faces increases. FIGS. 8A and 8B show a flowchart for illustrating the processing of a self-timer photographing done when the AE processing and/or the AF processing is done after the number of detected faces increases and after the result of detection of face is stabilized. In FIGS. 8A and 8B, the steps analogous to those in FIGS. 6A and 6B will be given the same reference numerals and will not be described, here.

As shown in FIG. 8B, after the CPU 75 determines whether the number of detected faces from before the count down, that is, whether B>A (step S124), the CPU 75 checks the amount of change of each face from the face detecting history by the face detecting portion 65 (step S140). Though being an amount of movement of the position of the faces, here, "the amount of change" may be, for instance, the fluctuation of the sizes of the faces or the amount of change of the orientations and/or the inclinations of the faces.

Then the CPU 75 checks whether the amount of change of each face is stabilized. When the amount of change is stabilized, that is, when the result of detection of faces is stabilized (step S141 YES), the CPU 75 determines the face on which the photographing conditions such as AF are focused, and sets the area of the face as the AF area. Then the AF processing is carried out on the basis of the set AF area (step S126). When "the amount of change" is smaller than a predetermined threshold value determined in advance, it is determined that an object is still or the amount of change that is, the result of detection of faces is stabilized. When the amount of change is not stabilized, S141:NO), the CPU 75 determines whether the count by the timer system of the self-timer photographing portion 66 reaches 0 (step S143), and when the count is 0 (step S143:YES), the CPU 75 shifts its processing to step S142. When the count is not 0 (step S143:NO), the CPU 75 shifts its processing to step S140.

By thus carrying out the self-timer photographing, since the AF processing is done after the photographer himself or herself enters the field of coverage and movement of the photographer himself or herself is completed, an image where the photographing conditions such as the AF are surely focused on the photographer himself or herself and the photographer himself or herself is in focus can be obtained as in the preceding embodiments.

Figure 9A:
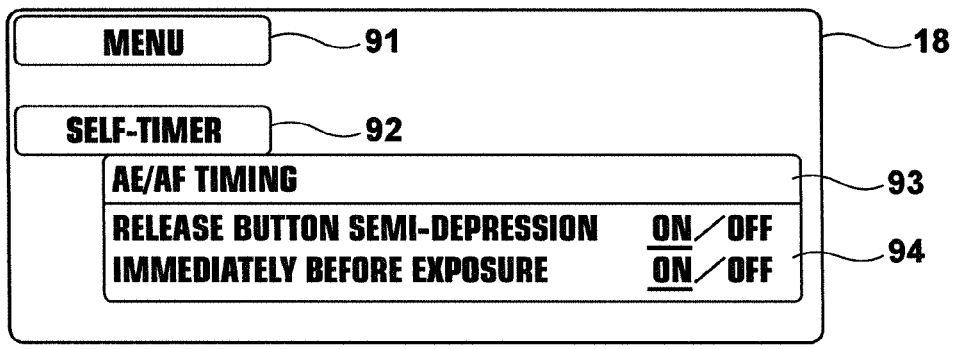
FIGS. 9A to 9C are views showing examples of menu displays for the self-timer photographing.
Figure 9B:
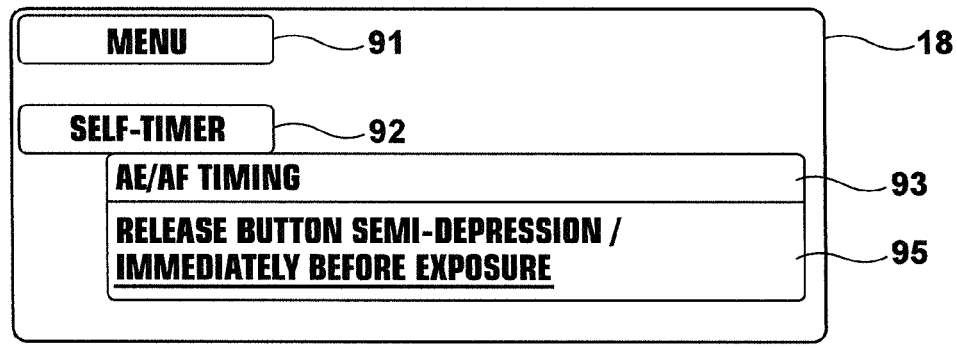
Figure 9C:
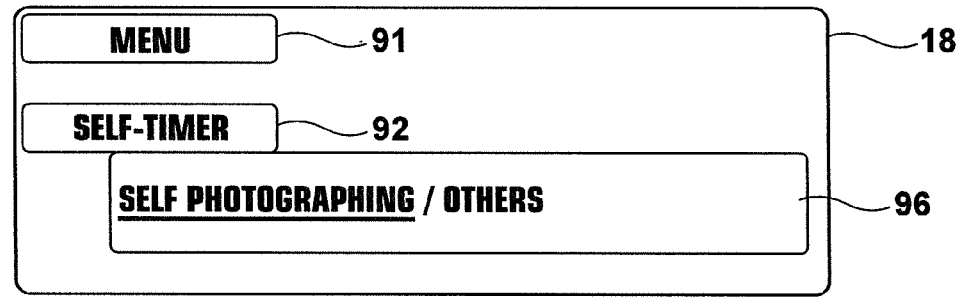

Though, in this embodiment, the AE processing and/or the AF processing are carried out at the timing described above, this invention need not be limited to such an arrangement but, for instance, the timing of the AE processing and/or the AF processing may be set or selected arbitrarily by the user. FIGS. 9A to 9C are views showing examples of menu displays for the self-timer photographing. As shown in FIG. 9A, when the self-timer 92 is selected on the menu screen 91, the timing 93 at which the AE processing and the AF processing are carried out may be selected one of, for instance, "in response to a semi-depression of the shutter release button 19" and "immediately before exposure" separately from each other by ON/OFF 94. When all is set to be OFF, a display that "Please set at least one to be ON" will appear on the monitor 18.

Further, as shown in FIG. 9B, the timing 93 at which the AE processing and the AF processing are carried out may be selected one of a plurality of timings 95, for instance, "in response to a semi-depression of the shutter release button 19" and "immediately before exposure".

Further, as shown in FIG. 9C, when the self-timer 92 is selected on the menu screen 91, whether a self-photographing mode is to be carried out may be selected 96. In this case, it is possible to carry out the AE processing and the AF processing immediately before exposure when a self-photographing mode is selected and otherwise to carry out the AE processing and the AF processing in response to a semi-depression of the shutter release button 19. The "self-photographing" is a method of photographing where the photographer himself or herself joins the photographing as an object.

With this arrangement, when a running image is taken with the photographer himself or herself as an object, an image with brightness suitable to the photographer and/or with focus in the photographer can be obtained.

In accordance with the digital camera described above, since when a running image is to be exposed by the use of the self-timer photographing portion 66, the AE processing and/or the AF processing are carried out according to the result of the face detection by the AE/AWB processing portion 63 and/or the AF processing 62 between when the shutter release button 19 is full-depressed and when a running image is exposed, when a face is detected after the shutter release button 19 is fully depressed, the AE processing and/or the AF processing can be done in the area of the face. Accordingly, for instance, even when the photographer himself or herself is an object, an image with brightness suitable to the photographer and/or with focus in the photographer can be obtained.

Figure 10:
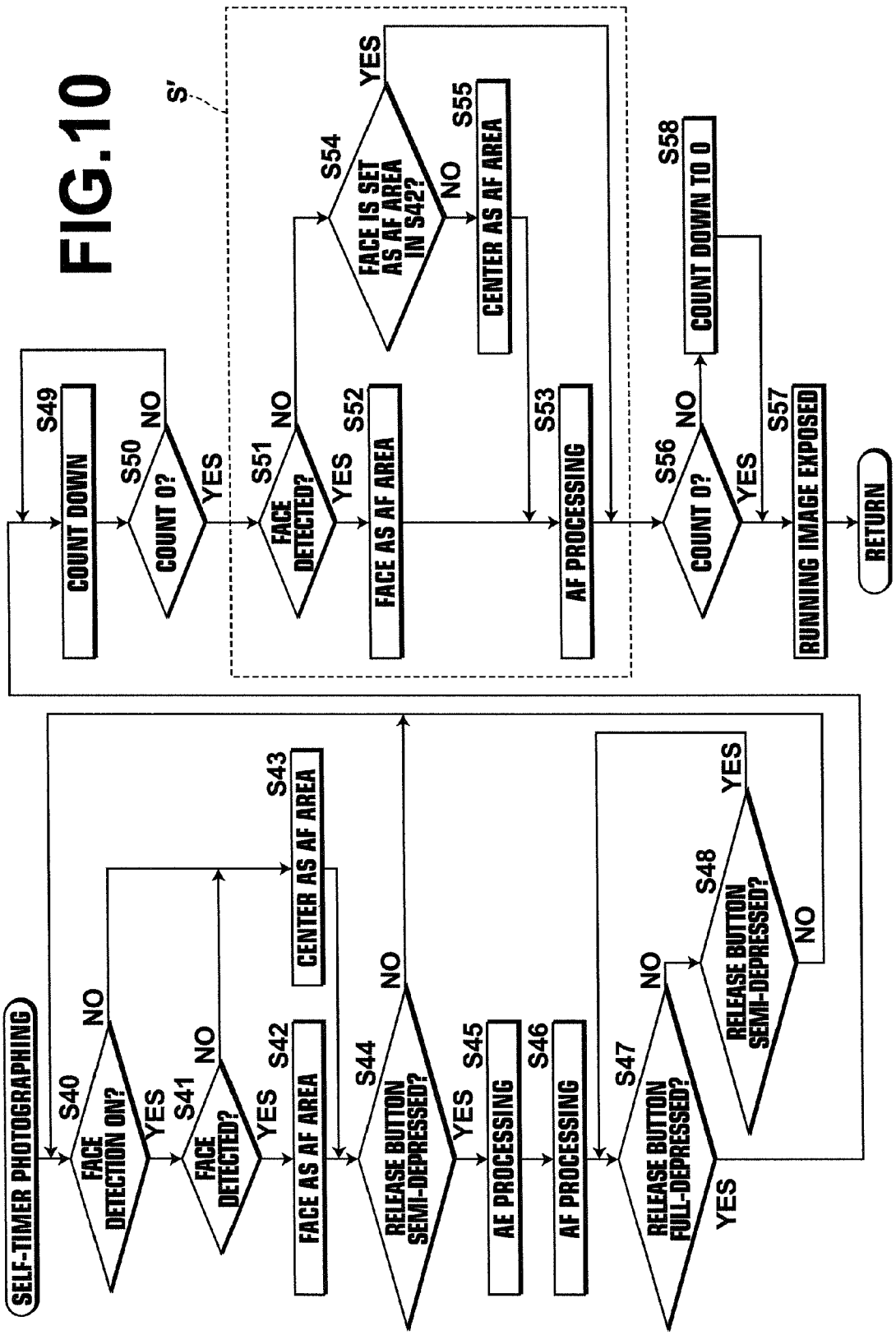
FIG. 10 is a view showing a flowchart for illustrating the fifth processing of the self-timer photographing.

Another digital camera will be described as an image-taking system of the present invention, hereinbelow. Since the digital camera of this embodiment is similar to the digital camera 1 of the above embodiments, the basic parts will not be described, and the flow of the self-timer photographing, which is different from the above embodiments, will only be described. A flowchart of the self-timer photographing in this embodiment is shown in FIG. 10. Since the self-timer photographing in this embodiment is the same as FIG. 5 in the flow up to step S49 where the count down is started as shown in FIG. 10, steps up to step S49 will not be described.

As shown in FIG. 10, when the count down is started (step S49), the CPU 75 determines whether the waiting time or the count reaches to a predetermined time N (step S50). When the count is not N (step S50:NO), the CPU 75 shifts its processing to step S49. When the count is N (step S50:YES), the CPU 75 determines whether a face has been detected (step S51).

When a face has been detected (step S51:YES), the area of the face is set as the AF area, while when a face has not been detected (step S51:NO), whether the area of the face has been set as the preceding AF area that is, whether the area of the face has been set as the AF area in step S42, is determined (step S54). When the area of the face has not been set as the AF area in step S42 (step S54:NO), the center of the object is set as the AF area.

When the AF area is set in step S52 or S55, the AF processing is carried out on the basis of the set AF area (step S53). Then, the CPU 75 determines whether the count reaches 0 (step S56), and when the count is 0 (step S56:YES), the CPU 75 exposes a running image on the basis of data output from the AF portion 62 in step S53 (step S57).

On the other hand, when the count is not 0 (step S56:NO), the CPU 75 shifts its processing to step S57 after continuing the processing until the count reaches 0 (step S58) and exposes a running image (step S57).

When the area of the face has been set as the AF area in step S42 (step S54:YES), the CPU 75 shifts its processing to step S56 without the AF processing, and exposes a running image on the basis of data output from the AF processing 62 in step S46 when the count reaches 0 (step S57).

By thus carrying out the self-timer image-taking, since whether a face has been detected is determined by the CPU 75 before the count reaches 0 and the AF processing and/or the AE processing are done according to the result of determination, it can be reduced the time which is required from when the count reaches 0 to when a running image is exposed. The count N may be arbitrarily set by the user.

Further, when the count reaches 0 during steps S50 to S56 in FIG. 10, that is, before the AF processing (step S53) is completed in the processing denoted by S' in FIG. 10, exposure of a running image is done (step S57) after the AF processing (step S53) is completed. The present invention need not be limited to this arrangement but, for instance, when the count reaches 0 before the AF processing (step S53) is completed, the AF processing in step S53 may be positively ended and exposure of a running image may be carried on the basis of data output from the AF processing 62 in step S46 when the count reaches 0 (step S57).

The determination in step S51 whether a face has been detected by the CPU 75 is carried out only when the face detecting button 27 is ON (step S40:YES), and when the face detecting button 27 is OFF (step S40:NO), the CPU 75 determines the center of the object as the Af area in response to semi-depression of the shutter release button 19 in step S44 (step S44:YES) without the AF processing, and a running image is exposed while when the count is 0 in step S56 (step S56:YES), a running image is exposed without the AF processing (step S37). At this time, the AF processing where the center of the object is determined to be the Af area need not be limited to when the shutter release button 19 is semi-depressed but may be, for instance, when the count is 0 in step S56.

Figure 11:
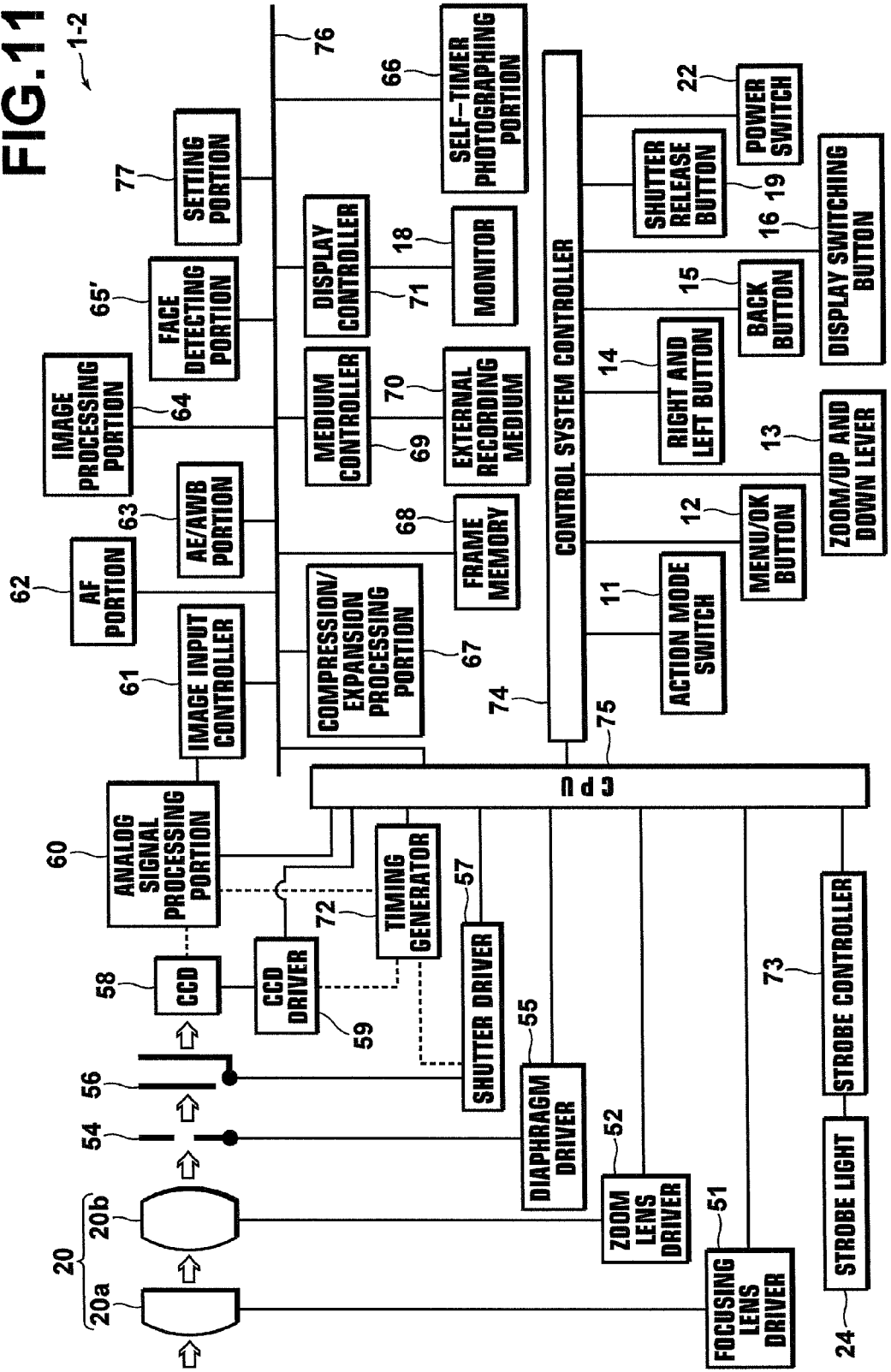
FIG. 11 is a block diagram showing structure of a second digital camera.

Another digital camera 1-2 will be described as an image-taking system of the present invention, hereinbelow. FIG. 11 is a block diagram showing structure of the digital camera 1-2. As shown in FIG. 11, the digital camera 1-2 is further provided with a setting portion 77 in addition to the structure of the digital camera 1 of the above embodiment, and the face detecting portion 65' in this embodiment can detect a plurality of faces in different states such as front faces and side faces. In FIG. 11, the parts analogous to those in FIG. 3 will be given the same reference numerals and will not be described.

The setting portion 77 sets the face detecting condition by the face detecting portion 65' to a condition under which one of the faces in different states is detected and in this particular embodiment, the setting is done when the self-timer photographing is turned ON.

Figure 12:
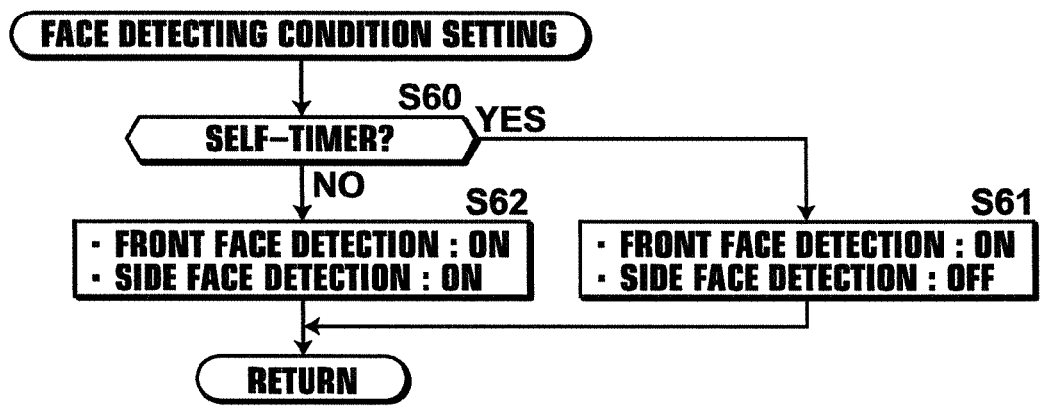
FIG. 12 is a view showing a flowchart for illustrating a first example of face detecting condition setting processing.
Figure 13A:
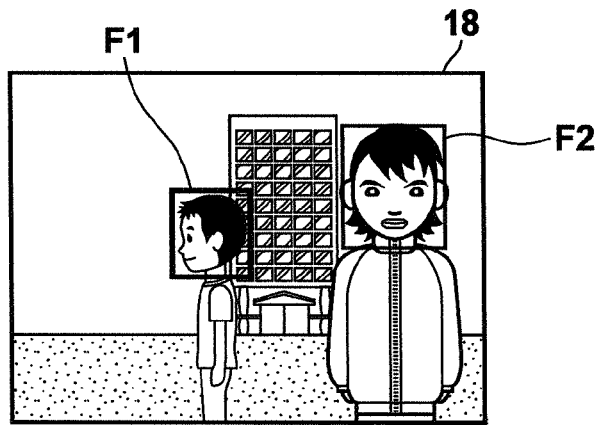
FIGS. 13A and 13B are views for illustrating an example of result of the face detection.
Figure 13B:
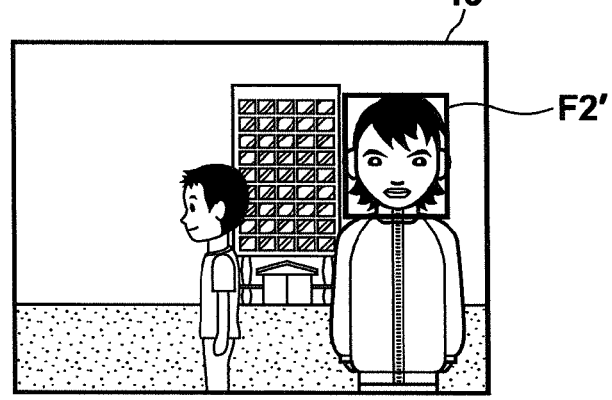

Setting of the face detecting condition by the face detecting portion 65' will be described in detail with reference to the drawings hereinbelow. FIG. 12 is a flowchart for illustrating setting processing of the face detecting condition and FIGS. 13A and 13B are views for illustrating an example of result of the face detection in the digital camera 1-2 processed with setting of the face detecting condition shown in FIG. 12.

For example, when an image is taken with the photographer himself or herself employed as an object in the self-timer image-taking with a digital camera 1-2 controlled to set the AF area in the face toward the center when a plurality of faces are detected by the face detecting portion 65', the photographer himself or herself normally stands in front of the taking lens 20 after full-depressing the shutter release button 19. Accordingly, since the photographer himself or herself cannot know the accurate position where his or her face is taken, that is, the photographer himself or herself cannot know whether his or her face is taken near the center, he or she cannot check whether the area of his or her face is in the AF area. Accordingly, it is necessary to surely focus the photographing conditions such as the AF on the photographer himself or herself when the self-timer photographing is carried out under the photographing condition where there is a face other than his or her own face.

It is often the case that the face of the human which forms the main object is directed toward the front of the taking lens 20. When the face detecting portion 65' detects, for instance, side faces and front faces as faces in different states, the face detecting portion 65' detects a side face F1 and a front face F2 which is a main object when a main object which the photographer intends (e.g., the photographer himself or herself) is to be taken under the conditions where there is a side face F1, which the photographer does not intend, near the center of the field of coverage. However, since the side face F1 is positioned nearer to the center, the area of the side face F1 is set as the AF area as shown in FIG. 13A.

Accordingly, in the digital camera 1-2 of this embodiment, the face detecting condition is set to detect only the front face when self-timer photographing is carried out.

In the face detecting condition setting, the CPU 75 first determines whether the self-timer is ON (step S60) as shown in FIG. 12. When the self-timer is ON (step S60:YES), the setting portion 77 sets the face detecting condition by the face detecting portion 65' to detect only the front face while not to detect the side face (step S61).

When the self-timer is not ON (step S60:NO), the setting portion 77 sets the face detecting condition by the face detecting portion 65' to detect both the front face and the side face (step S62).

By causing the setting portion 77 to set the face detecting condition to detect faces in a limited orientation when self-timer photographing is ON, the face detecting portion 65' can be controlled to detect only the front face. Since under the same condition as shown in FIG. 13A, the face detecting portion 65' detects only the front face F2' as shown in FIG. 13B, the photographing conditions such as the AF can be surely focused on the front face of the main object, for instance, the photographer himself or herself.

Though, in this embodiment, the setting portion 77 sets the face detecting condition not to detect side faces, the present invention need not be limited to such an arrangement but the setting portion 77 may set the face detecting condition not to detect upward-oriented faces, downward-oriented faces, inclined faces or the like.

Figure 14:
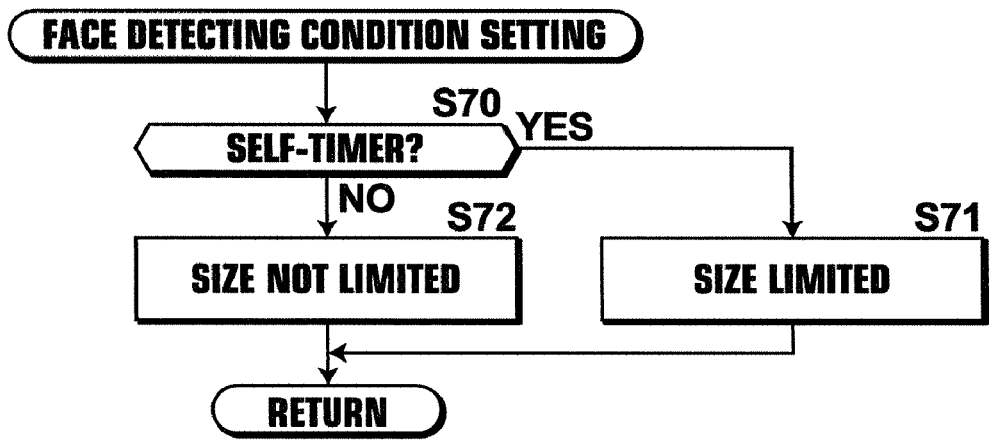
FIG. 14 is a view showing a flowchart for illustrating a second example of face detecting condition setting processing.
Figure 15A:
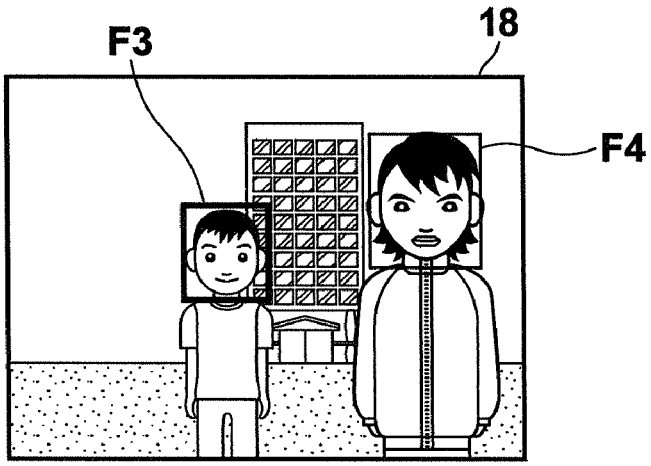
FIGS. 15A and 15B are views for illustrating another example of result of the face detection.
Figure 15B:
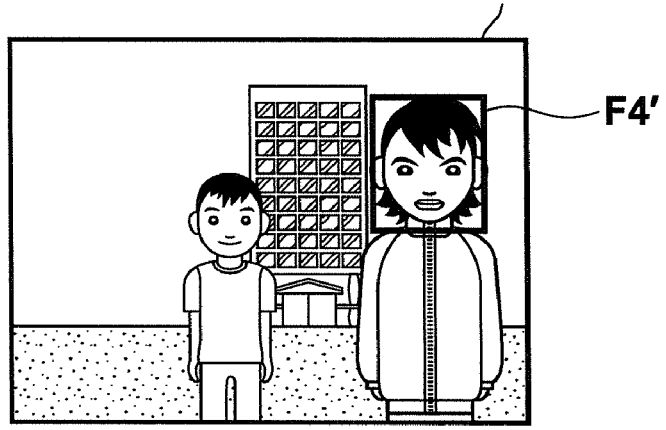

Further, though, in this embodiment, the setting portion 77 sets the face detecting condition to detect only faces of limited orientations, the present invention need not be limited to such an arrangement but the setting portion 77 may set the face detecting condition to detect only faces of limited sizes. FIG. 14 is a flowchart for illustrating setting processing of the face detecting condition in another embodiment of the present invention. FIGS. 15A and 15B are views for illustrating an example of result of the face detection in the digital camera 1-3 processed with setting of the face detecting condition shown in FIG. 14.

When the face detecting portion 65' in this embodiment detects a plurality of faces in different sizes as faces in different states, the face detecting portion 65' detects a face of a small size F3 and a face F4 of a large size (F4>F3) which is a main object when a main object which the photographer intends (e.g., the photographer himself or herself) is to be taken under the conditions where there is a face of a small size F3, which the photographer does not intend, near the center of the field of coverage. However, since the face of a small size F3 is positioned nearer to the center, the area of the face of a small size F3 is set as the AF area as shown in FIG. 15A.

Accordingly, in this embodiment, the face detecting condition is set to detect only faces which is in a predetermined range in size, e.g., not smaller than 1/M and not larger than 1/N of the shorter side of the image, between 1/M and 1/N of the shorter side of the image.

In the face detecting condition setting, the CPU 75 first determines whether the self-timer is ON (step S70) as shown in FIG. 14. When the self-timer is ON (step S70:YES), the setting portion 77 sets the face detecting condition by the face detecting portion 65' to detect only the face in the predetermined range.

When the self-timer is not ON (step S70:NO), the setting portion 77 sets the face detecting condition by the face detecting portion 65' to detect all the faces without limiting the size thereof (step S72).

By causing the setting portion 77 to set the face detecting condition to detect faces in a limited size when self-timer photographing is ON, the face detecting portion 65' can be controlled to detect only faces in a predetermined range in size. Since under the same condition as shown in FIG. 15A, the face detecting portion 65' detects only the face F4' of the main object in a predetermined range in size as shown in FIG. 15B, the photographing conditions such as the AF can be surely focused on the face of the main object, for instance, the photographer himself or herself.

Figure 16A:
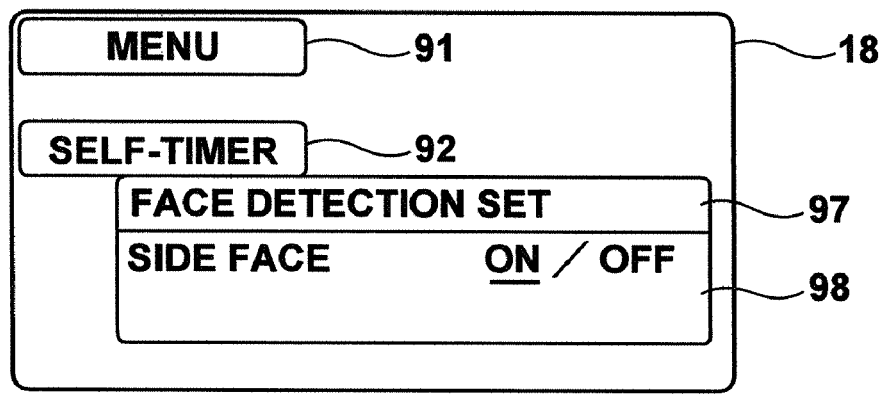
FIGS. 16A and 16B are views showing examples of menu displays for the self-timer photographing.
Figure 16B:
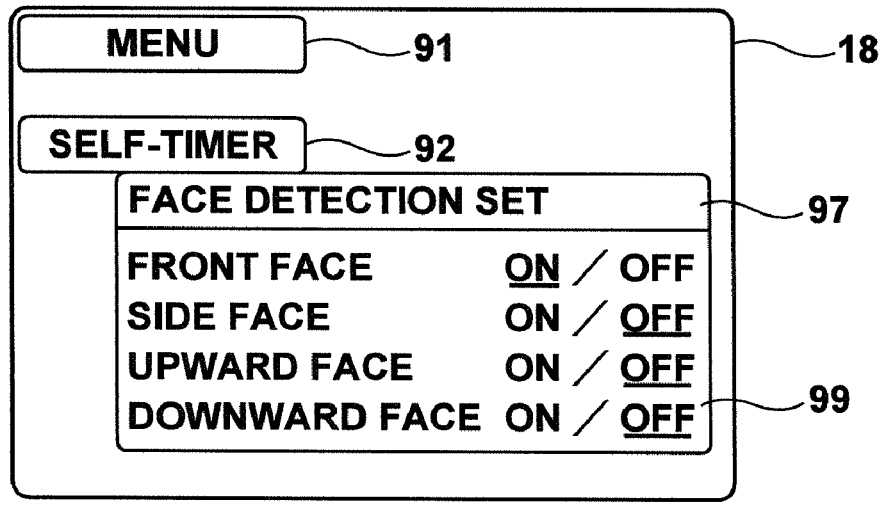

Though, in this embodiment, the setting portion 77 automatically sets the face detecting condition in response to setting of the self-timer to be ON, the present invention need not be limited to such an arrangement but the setting portion 77 may manually set the face detecting condition. FIGS. 16A and 16B are views showing examples of menu displays for the self-timer photographing.

As shown in FIGS. 16A and 16B, when the user selects self-timer 92, the user selects ON/OFF of the state of the faces to be detected on the menu screen 91. For example, when the front faces are to be constantly detected, the setting portion 77 sets face detecting condition by the user's selection of ON/OFF 98 of whether the side faces are to be detected as shown in FIG. 16A.

Figure 17:
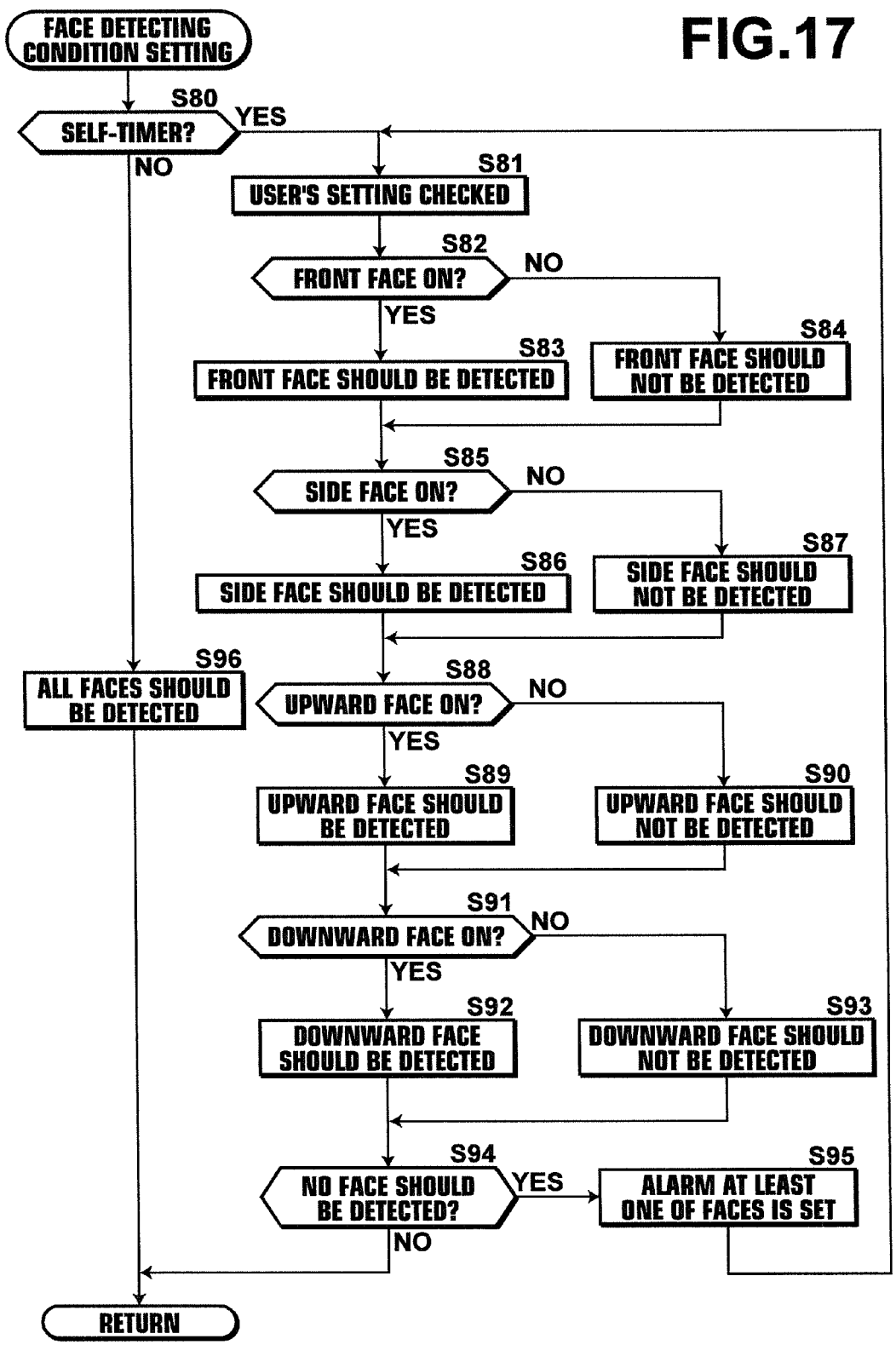
FIG. 17 is a view showing a flowchart for illustrating a third example of face detecting condition setting processing.

When the state of face to be constantly detected has not been determined, the setting portion 77 sets face detecting condition by the user's selection of ON/OFF 99 of individual states of face as shown in FIG. 16B. FIG. 17 is a view showing a flowchart for illustrating face detecting condition setting processing of FIG. 16B.

As shown in FIG. 17, the CPU 75 first determines whether the self-timer is ON (step S80). When the self-timer is ON (step S80:YES), the setting portion 77 checks the face detecting condition by the user (step S81).

Then the setting portion 77 first determines whether the front face is ON (step S82). When the front face is ON (step S82:YES), the setting portion 77 takes the front face as a face to be detected (step S83) and when the front face is not ON (step S82:NO), the setting portion 77 takes the front face as a face not to be detected (step S84).

Next the setting portion 77 determines whether the side face is ON (step S85). When the side face is ON (step S85: YES), the setting portion 77 takes the side face as a face to be detected (step S86) and when the front face is not ON (step S85:NO), the setting portion 77 takes the side face as a face not to be detected (step S87).

Next the setting portion 77 determines whether the upward face is ON (step S88). When the upward face is ON (step S88:YES), the setting portion 77 takes the upward face as a face to be detected (step S89) and when the upward face is not ON (step S88:NO), the setting portion 77 takes the upward face as a face not to be detected (step S90).

Next the setting portion 77 determines whether the downward face is ON (step S91). When the upward face is ON (step S91:YES), the setting portion 77 takes the upward face as a face to be detected (step S92) and when the upward face is not ON (step S91:NO), the setting portion 77 takes the upward face as a face not to be detected (step S93).

The setting portion 77 further determines whether all the ON/OFF in FIG. 16B is OFF, that is, none of the faces should be detected (step S94). When none of the faces should be detected (step S94:YES), the setting portion 77 makes an alarm that, at least one of the faces should be detected, on the monitor 18 (step S95) and the CPU 75 shifts its processing to step S81. When all the faces should not be detected (step S94:NO), the setting portion 77 sets the face determined to be detected in steps S82 to S83 as the face detecting condition.

When self-timer is not ON in step S80 (step S80:NO), the setting portion 77 determines all the faces should be detected (step S96). In this manner, the setting portion 77 may manually determine the face detecting condition by the user.

Though the front face, side face, upward face and the downward face are proposed as the states of faces in this embodiment, the inclination of faces may be similarly set.

Figure 18:
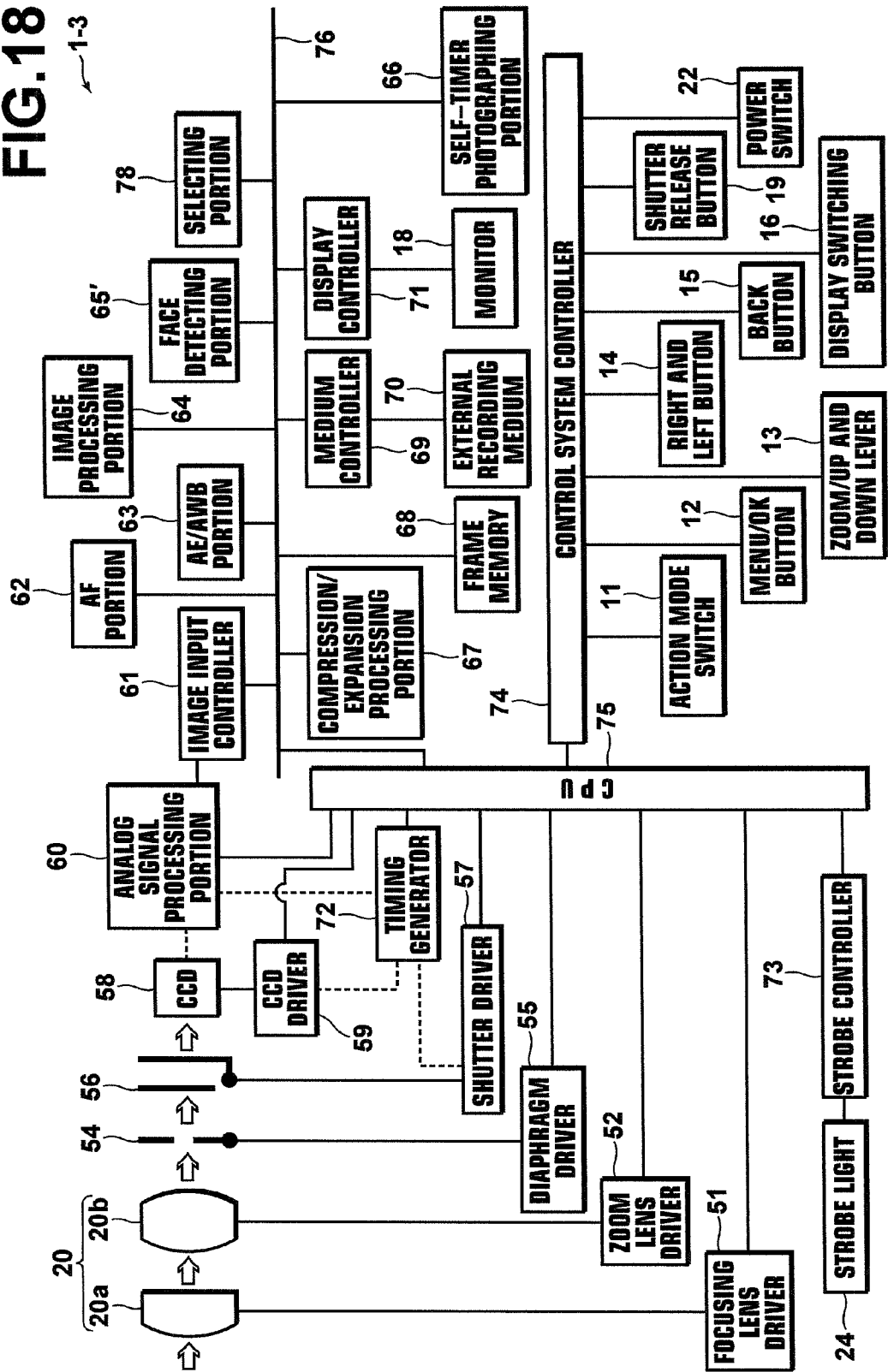
FIG. 18 is a block diagram showing structure of a third digital camera.

Though, in the digital camera 1-2 of this embodiment, the setting portion 77 sets the face detecting condition, under which the faces are detected by the face detecting portion 65', to be a condition to detect one of the faces in a plurality of different states, this invention need not be limited to this arrangement. FIG. 18 is a block diagram showing structure of a digital camera 1-3 in accordance with another embodiment of the present invention. As shown in FIG. 18, the digital camera 1-3 of this embodiment is provided with a selecting portion 78 for selecting one of the faces in a plurality of different states instead of the setting portion 77 of the digital camera 1-2.

The selecting portion 78 sets a selecting condition in substantially the same manner as in the face detecting condition setting (FIGS. 12 and 14), and, for instance, when a side face F1 and a front face F2 are detected as shown in FIG. 13A, selects only the front face F2' without selecting the side face F1 as shown in FIG. 13B, whereby the photographing conditions such as the AF are focused on the selected front face F2'.

Further, the selecting portion 78, for instance, when a small face F3 and a face F4 which is in the desired range in size are detected as shown in FIG. 15A, selects only the face F4' in the desired range in size without selecting the small face F4 as shown in FIG. 15B, whereby the photographing conditions such as the AF are focused on the selected large face F4'.

When, after the faces in different states are detected by the face detecting portion 65', one of them are selected and the photographing conditions such as the AF are focused on the selected face, it is possible to surely focusing the photographing conditions such as the AF on the face of the main object.

Figure 19A:
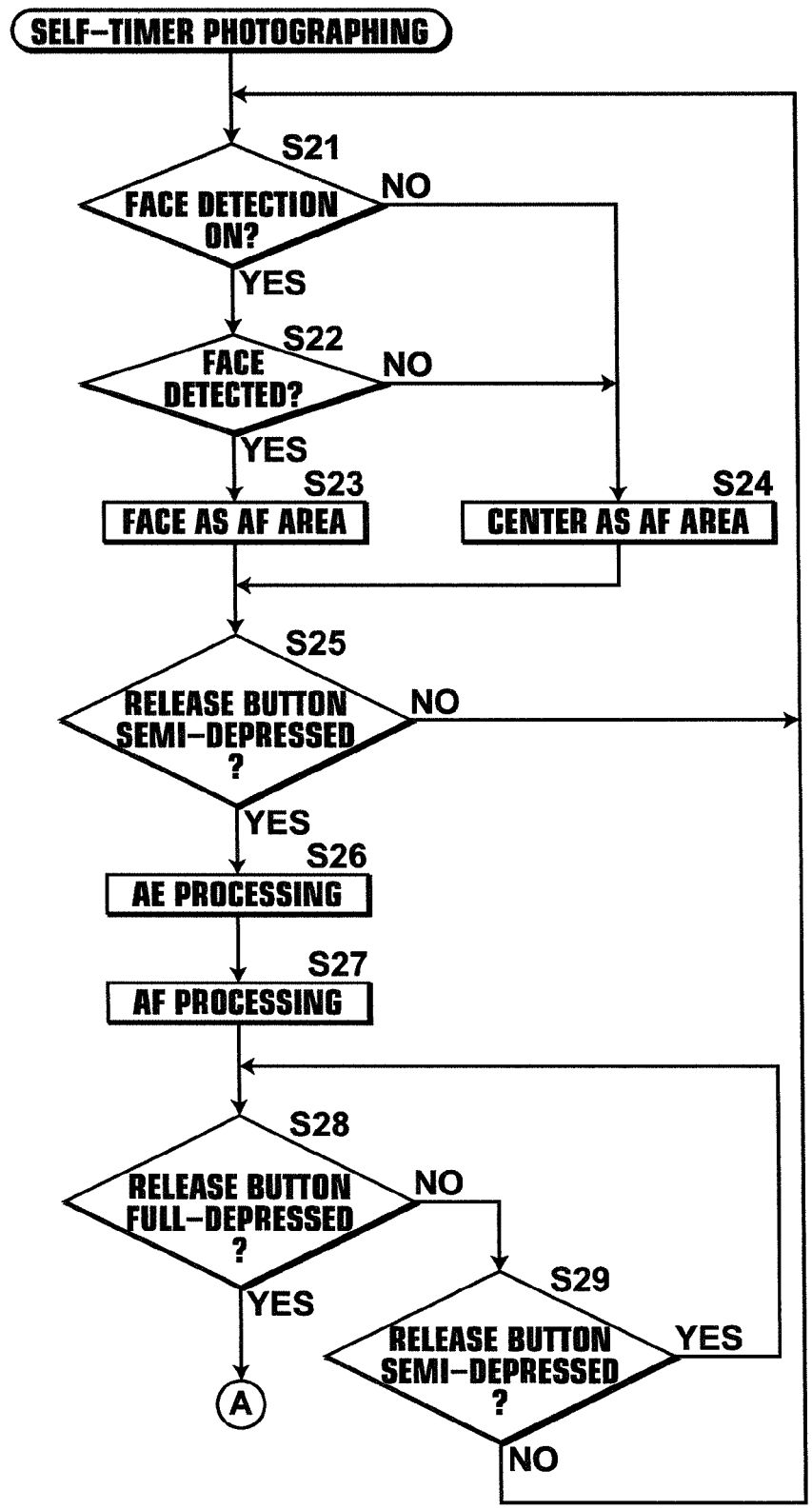
FIG. 19A is a part of a view showing a flowchart for illustrating the sixth processing of the self-timer photographing.
Figure 20A:
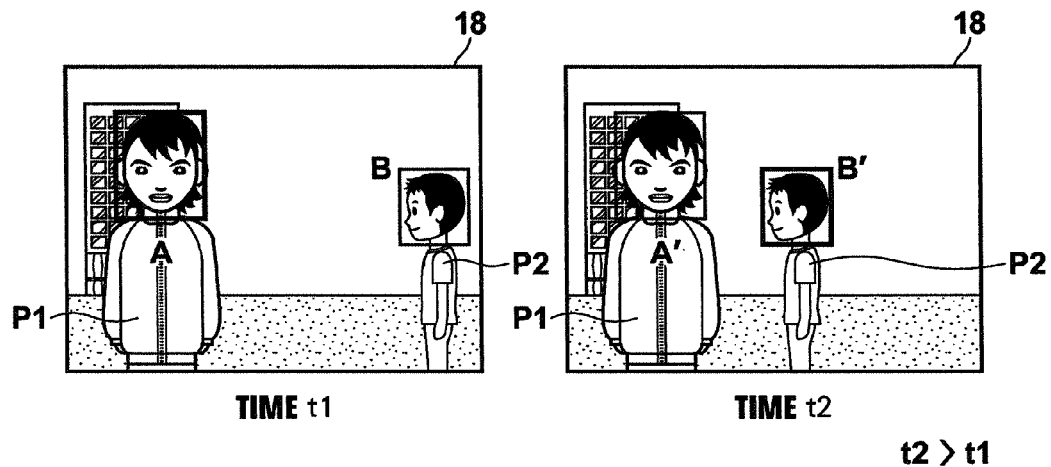
FIGS. 20A and 20B are views for illustrating another example of result of the face detection respectively showing without and with taking into account the amount of fluctuation.
Figure 20B:
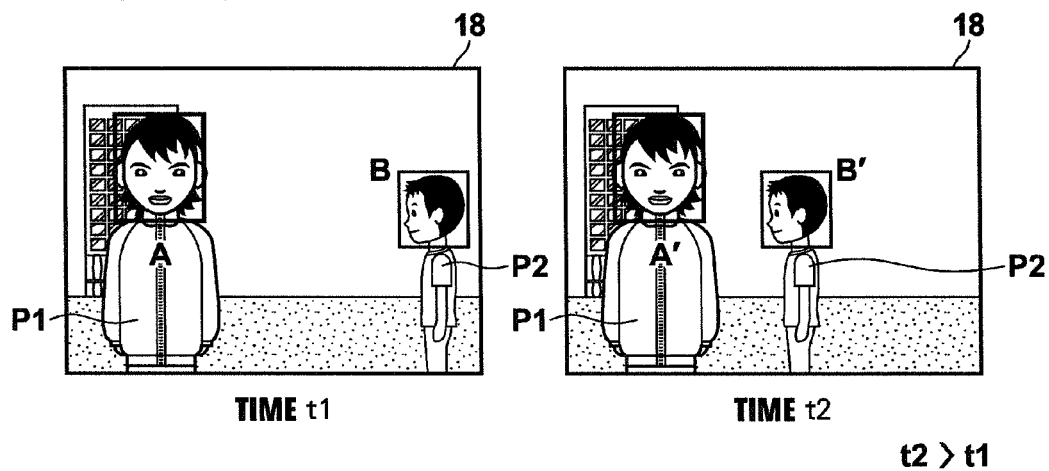

Further, the selecting portion 78 may be set not to select faces detected by the face detecting portion 65' which is larger in fluctuation than a predetermined value. FIG. 19A is a part of a view showing a flowchart for illustrating the self-timer photographing taking into account the fluctuation of the face, FIG. 19B is the other part of a view showing a flowchart for illustrating the same, and FIGS. 20A and 20B are views for illustrating another example of result of the ace detection respectively showing without and with taking into account the amount of fluctuation. In FIGS. 19A and 19B, the steps analogous to those shown in FIG. 5 will be given the same reference numerals and will not be described.

When the digital camera 1-3 is controlled to set the AF area in the area of the face nearest to the center when a plurality of faces are detected by the face detecting portion 65', since the human who is the main object generally does not move before a running image is taken, the selecting portion 78 does not select the face large in fluctuation so that the photographing conditions such as the AF are not focused on the face which is large in fluctuation.

Specifically, when a face has been detected in step S32 (step S32:YES), the selecting portion 78 checks the fluctuation of each face from the detecting history (step S100), and does not select faces large in fluctuation so that the photographing conditions such as the AF are not focused on the face which is large in fluctuation (step S101).

Then the CPU 75 determines whether there is a face on which the photographing conditions such as the AF are focused (step S102). When there is a face on which the photographing conditions are focused (step S102:YES), the CPU 75 determines the face to be a face on which the photographing conditions are focused (step S103), and sets the area of the face as the AF area (step 8104).

When there is no face on which the photographing conditions are focused in step S102 (step S102:NO), the CPU 75 shifts its processing to step S35.

For example, when the face detecting portion 65' detects a face A of a human P1 which is a main object intended by the photographer in the left side of the field of coverage and a face B of a human P2 which is an object not intended by the photographer in the right side end portion of the field of coverage at time t1 as respectively shown in left ones of FIGS. 20A and 20B, and detects at time t2 after the time t1 a face A' of a human P1 who is in substantially the same position in the field of coverage, that is, who is smaller in movement than a predetermined value and a face B' of a human P2 who moved to the center from the right side end portion in the field of coverage, that is, who is larger in movement than a predetermined value, the photographing conditions are focused on the face A nearer to the center than the face B at the time t1 while the photographing conditions are focused on the face B which comes nearer to the center than the face A by the movement at the time t2 after the time t1 as shown in right ones of FIGS. 20A and 20B, in the case where the fluctuation is not taken into account.

On the other hand, in the case where the fluctuation is taken into account as described above, since the selecting portion 78 does not select the face B' of the human P2 which is large in movement, the photographing conditions are focused on the face A' of the human P1 which is small in movement, whereby the photographing conditions such as the AF are surely focused on the main object such as the photographer himself or herself.

Though the movement of position of faces has been described in this embodiment as an example of the amount of fluctuation, the present invention need not be limited to this arrangement but the amount of fluctuation may be, for instance, the fluctuation of the size of the face, or the rate of change of the orientation or of the inclination of the faces.

Figure 21A:
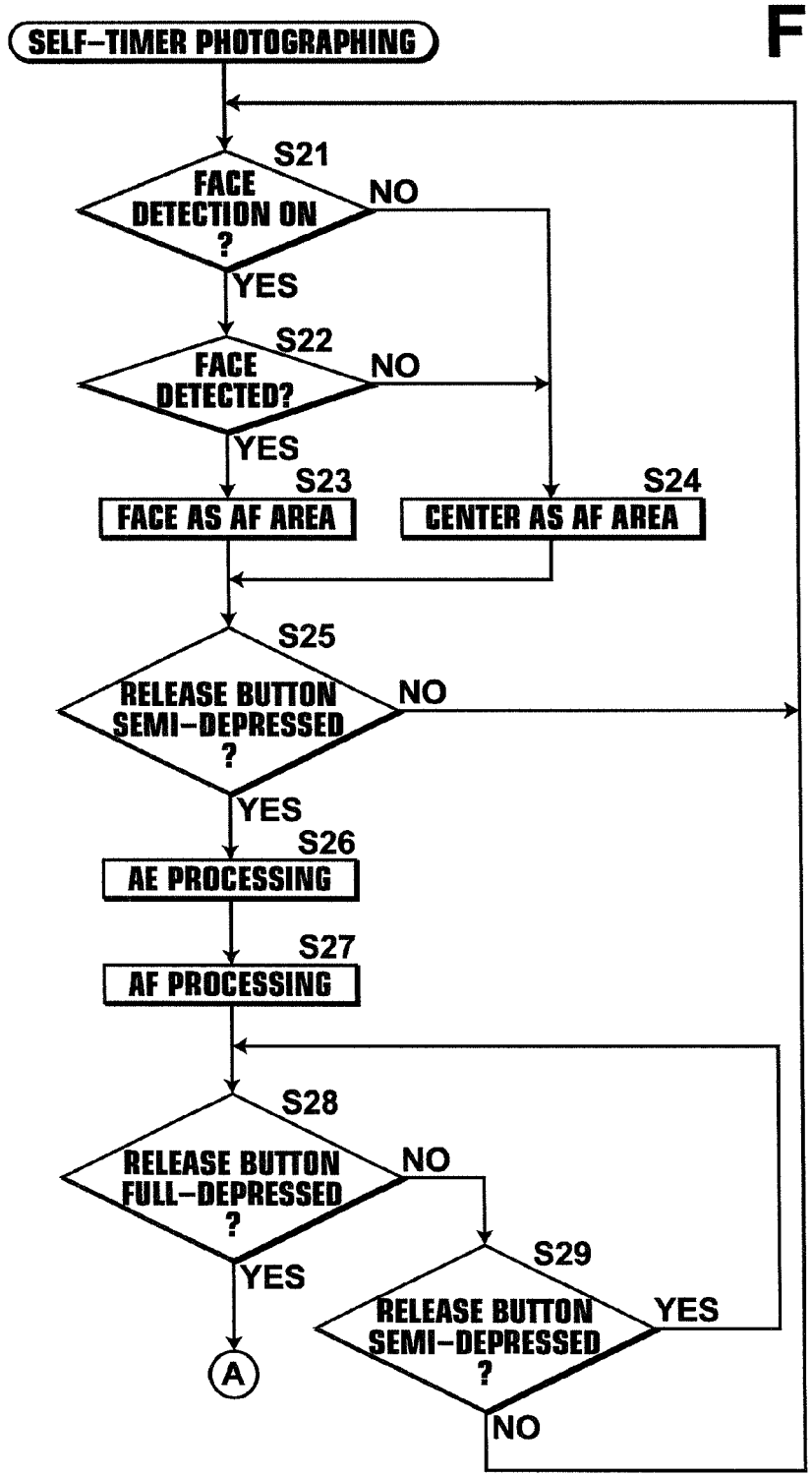
FIG. 21A is a part of a view showing a flowchart for illustrating the seventh processing of the self-timer photographing.
Figure 21B:
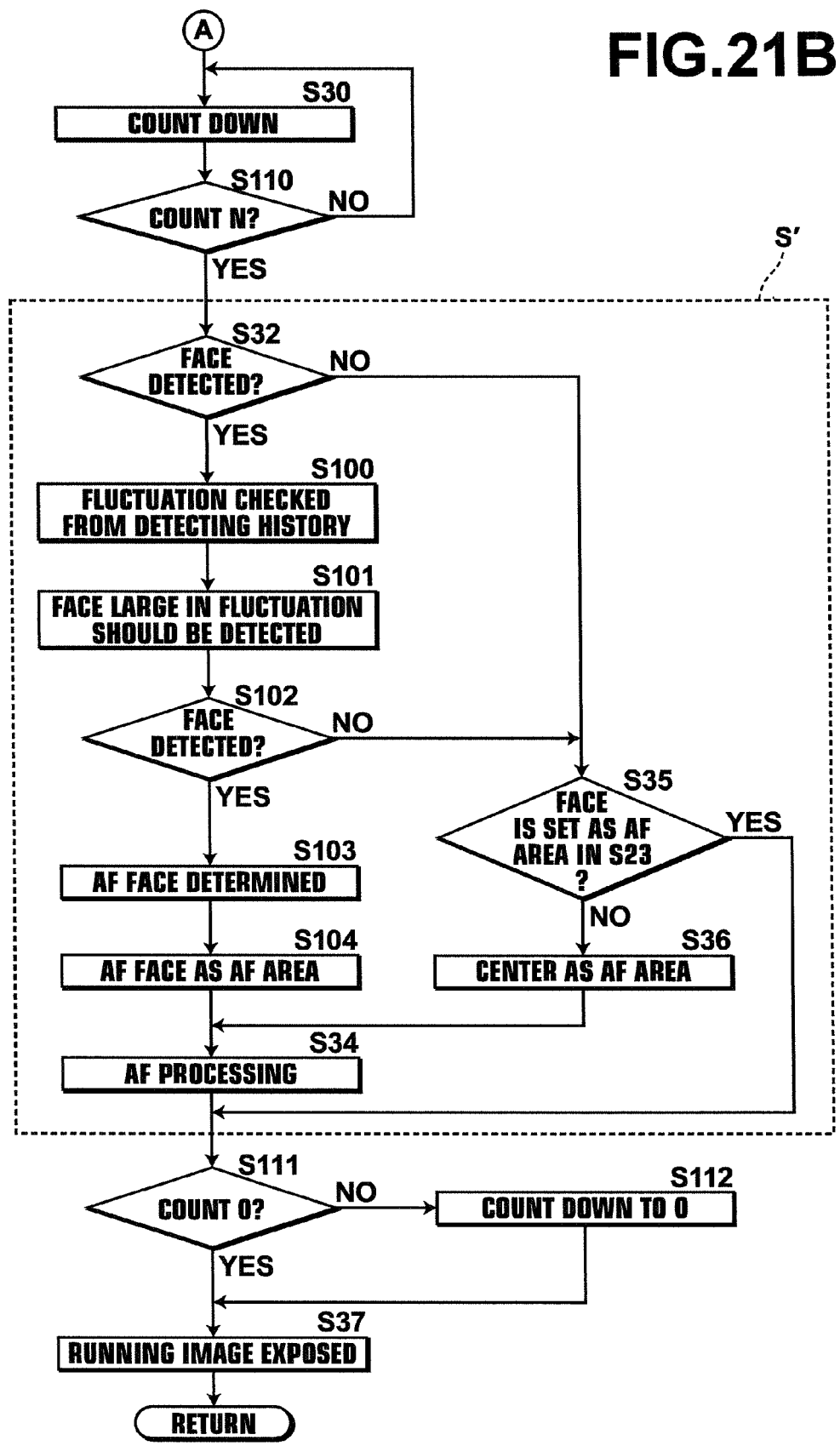
FIG. 21B is the other part of a view showing a flowchart for illustrating the seventh processing of the self-timer photographing.

A digital camera in accordance with another embodiment of the present invention will be described, hereinbelow. Since the digital camera of this embodiment is the same as the digital camera 1-3 of the above embodiment in structure, flow of the self-timer photographing, which is the different part, only will be described. In FIGS. 21A and 21B, the steps analogous to those shown in FIGS. 19A and 19B will be given the same reference numerals and will not be described.

In the embodiment described above, a slight time lag is generated before the running image is exposed after the count reaches 0 since the selecting portion 78 carries out the steps S100 to S104 that is, from checking of the fluctuation to setting of the Af area and the AE processing and/or the AF processing are carried out after the count reaches 0 in step S31 in FIG. 19B.

In the self-timer photographing of this embodiment, as shown in FIG. 21B, the CPU 75 determines whether the waiting time or the count reaches a predetermined time N (step S110) in response to start of the count down (step S30). When the count is not N (step S110:NO), the CPU 75 shifts its processing to step S30. When the count is N (step S110:YES), the CPU 75 determines whether a face has been detected (step S32). When a face has been detected (step S32:YES), the CPU 75 carries out the steps S100 to S104 that is, from checking of the fluctuation to setting of the Af area and the AE portion 62 executes the AF processing on the basis of the set Af area (step S34).

Then the CPU 75 determines whether the count reaches 0 (step S111). When the count reaches 0 (step S111:YES), a running image is exposed (step S37) on the basis of the data output from the AF processing portion 62 in step S34.

When the count is not 0 (step S111:NO), the CPU 75 continues count down until the count reaches 0 (step S112) and a running image is exposed in the step S37 when the count reaches 0 (step S37).

When the area of the face has been set as the AF area in step S23, the CPU 75 shifts its processing to step S111 without the AF processing and when the count reaches 0, exposes a running image on the basis of data output from the AF processing portion 62 in step S27 (step S37).

By thus exposing a running image upon self-timer photographing, since the selecting portion 78 carries out the steps S100 to S104 that is, from checking of the fluctuation to setting of the Af area and the AE processing and/or the AF processing are carried out before the count reaches 0, the time which is required from when the count reaches 0 to when a running image, that is, the time lag is exposed can be reduced. The count N may be arbitrarily set by the user.

When the count reaches 0 between steps S110 and S111 in FIG. 21B, that is, in S' in FIG. 21B before the AF processing (step S34) is completed, a running image is exposed (step S37) after the AF processing (step S34) is completed. The present invention need not be limited to this arrangement but, when the count reaches 0 before the AF processing (step S34) is completed, for instance the AF processing in step S34 may be positively ended and exposure of a running image may be carried on the basis of data output from the AF processing 62 in the preceding the AF processing or step S27 when the count reaches 0 (step S37).

Though in the digital camera of the preceding embodiment, the determination whether a face has been detected by the CPU 75 is carried out and the AF area is set before the shutter release button 19 is semi-depressed (step S25 or S44) in FIG. 5, 6A, 7A, 8A, 10, 19A or 21A, the present invention need not be limited to this arrangement but, for instance, they may be done after the shutter release button 19 is semi-depressed (step S25 or S44).

Though in the embodiments described above, a face is employed as the predetermined objective body, the present invention need not be limited to this arrangement but any objective body may be employed. Further, though in the embodiments described above, the center of the object is set as the AF area when no face has been detected, the present invention need not be limited to this arrangement but any part on the object may be set as the AF area.

Figure 22:
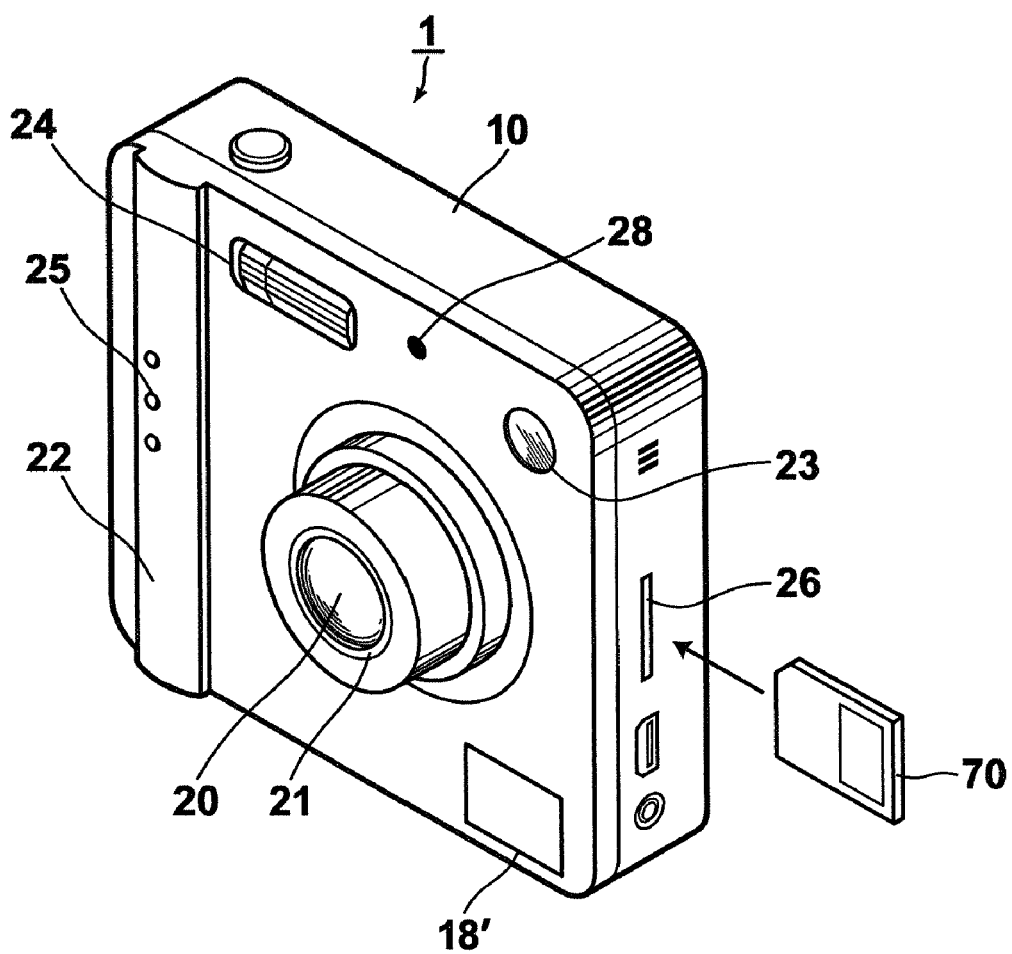
FIG. 22 is a perspective view showing the fourth digital camera as viewed from front.
Figure 23:
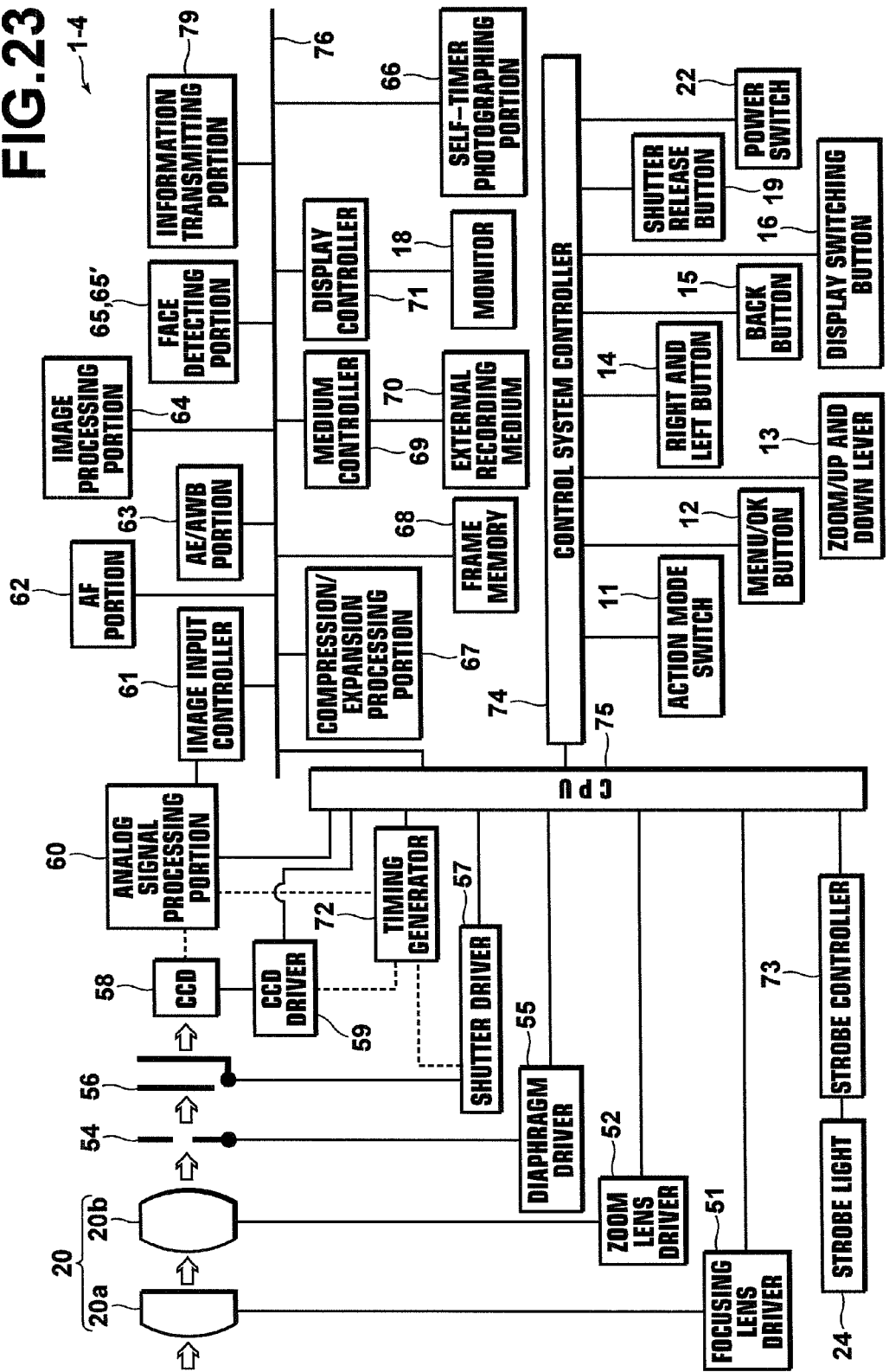
FIG. 23 is a block diagram showing structure of the fourth digital camera.

The image taking system of the present invention may be further provided with a transmitting means which when no face has been detected before a running image is exposed, informs of the photographer and/or a person whose image is to be taken that no face has been detected. The transmitting means may transmit that a face is detected. FIG. 22 is a perspective view showing the digital camera 1-4 which is added with the transmitting means to the structure of FIG. 22 as viewed from front, and FIG. 23 is a block diagram showing function of the digital camera 1-4.

During the face detection by the face detecting portion 65 or 651, the photographer is normally possible to check whether a face has been detected through a detecting frame or the like which surrounds the detected face and is displayed on the monitor 18 (FIG. 1) on the back of the camera body 10.

However, in the self-timer image-taking or the like where the photographer himself or herself is an object, since the photographer has to move to the front of the camera, it is very difficult to check whether a face has been detected in the above manner. Accordingly, the digital camera 1-4 of this embodiment is provided with a transmitting means which informs of the object whether a face has been detected.

In the digital camera 1-4 of this embodiment, for instance, an information transmitting portion 79 (FIG. 23) and an information displaying portion 18' (FIG. 22) such as a liquid crystal monitor for displaying information transmitted by the information transmitting portion 79 are provided and o is displayed on the information displaying portion 18' when a face is detected, while x is displayed on the information displaying portion 18' when a face is not detected.

With this arrangement, even in the self-timer image-taking or the like where the photographer himself or herself is an object, it becomes possible to check whether a face has been detected. Accordingly, the photographer can check that the photographer is not in the field of coverage and can enter the field of coverage, whereby a failure of photographing can be prevented.

The information transmitting portion 79 may display the number of the detected faces when a face is detected or may display a detecting frame as in the monitor 18 (FIG. 23) on the back of the camera body 10. In the case, where whether the number of the detected faces increases is checked by the face detecting portion 65 or 65', that the number of the detected faces increases may be displayed when the number of the detected faces increases.

The information transmitting portion 79 may transmit whether a face is detected by ON/OFF of a light emitting element not by displaying characters or marks. In this case, it is not necessary to provide an additional information displaying portion 18', and it is possible to use the AF auxiliary light 28 on the front of the digital camera. When the AF auxiliary light 28 is used, the AF auxiliary light 28 may be caused to emit light in a manner different from the normal AF auxiliary light 28. For example, the AF auxiliary light 28 may blink.

Further, the information transmitting portion 79 may transmit not visually but phonetically by emitting a sound information such as a voice or a sound toward the object.

A plurality of information transmitting means of various kinds may be prepared so that one of them can be arbitrary selected or set by the user.

Though digital cameras in accordance with embodiments of the present invention have been described above, a digital camera which is provided with, instead of or in addition to the self-timer photographing portion 66, an automatic image-taking portion which starts exposure of a running image by causing a depression signal of the shutter release button 19 to be output at a predetermined timing and carries out automatic image taking is also one of embodiments of the present invention. In this case, whether an objective body is detected is determined at least once when the shutter release button 19 outputs the depression signal and between a time when the shutter release button 19 outputs the depression signal and a time when a running image is exposed, the AE processing and/or the AF processing are done according to the result of determination.

The image taking system of the present invention may be suitably changed in the design thereof in the range not to depart from the spirit of the present invention without being limited to the digital camera described above.

What is claimed is:

1. An imaging apparatus, comprising:
    an imaging means for generating image data by photographing a subject;
    a target object detection means for detecting a target object from the image data;
    an exposure determination means for determining an exposure condition;
    a focus determination means for determining a focusing position;
    a photographing instruction means for instructing main exposure photographing; and
    a self-timer photographing means for timing a predetermined time period in response to an instruction to perform main exposure photographing issued by the photographing instruction means and causing the main exposure photographing to take place after the predetermined time period,
    wherein when main exposure photographing is performed using the self-timer photographing means:
    target object detection is performed by the target object detection means before the start of the timing;
    target object detection is performed at least once by the target object detection means during a period from the start of the timing to the performance of the main exposure photographing;
    a determination is made as to whether or not a new target object has been detected during a period from the start of the timing to the end of the predetermined time period; and
    when a new target object has been detected, target object detection is performed by the target object detection means before the end of the predetermined time period and the exposure condition and/or the focusing position is determined by the exposure determination means and focus determination means according to a result of the target object detection, while if a new target object has not been detected, target object detection is performed by the target object detection means after the end of the predetermined time period and before the main exposure photographing, and the exposure condition and/or the focusing position is determined by the exposure determination means and focus determination means according to a result of the target object detection.

2. The imaging apparatus of claim 1, wherein, when the main exposure photographing is performed using the self-timer photographing means, the exposure condition and/or the focusing position is determined by the exposure determination means and focus determination means in response to an instruction to perform the main exposure photographing issued by the photographing instruction means regardless of the result of the target object detection.

3. The imaging apparatus of claim 1, wherein, when the main exposure photographing is performed using the self-timer photographing means, the exposure condition and/or the focusing position is determined by the exposure determination means and focus determination means at a predetermined time point during the predetermined time period according to the result of the target object detection.

4. The imaging apparatus of claim 1, wherein the exposure condition and/or the focusing position is determined by the exposure determination means and focus determination means when a plurality of target objects is detected by the target object detection mean or after a predetermined time from the detection of the plurality of target objects.

5. The imaging apparatus of claim 1, wherein when a predetermined target object is detected by the target object detection means, the focus determination means determines the focusing position in an area of the target object, while if a predetermined target object is not detected by the target object detection means, the focus determination means determines the focusing position in a predetermined area.

6. The imaging apparatus of claim 1, wherein when a first focusing position is determined by the focus determination means before the instruction to perform the main exposure photographing is issued by the photographing instruction means, if a predetermined target object is detected by the target object detection means, the focus determination means determines the first focusing position in an area of the detected target object, and when the instruction to perform the main exposure photographing is issued by the photographing instruction means after the first focusing position has been determined, if a predetermined target object is detected by the target object detection means after the first focusing position has been determined, the focus determination means determines a second focusing position in an area of the detected target object, while if a predetermined target object is not detected by the target object detection means, the focus determination means does not perform focusing position determination.

7. The imaging apparatus of claim 1, wherein:
    the apparatus further comprises a mode selection means for allowing selection and performance of a specific photographing mode;
    when a specific photographing mode is selected and the main exposure photographing is performed using the self-timer photographing means, the exposure condition and/or the focusing position is determined by the exposure determination means and/or the focus determination means during a period from the issuance of the instruction to start the main exposure photographing to the performance of the main exposure photographing according to the result of the target object detection.

8. The imaging apparatus of claim 7, wherein the specific photographing mode is a self-photographing mode in which the user itself is photographed or a face detection/utilization photographing mode in which the target object is a face.

9. The imaging apparatus of claim 7, wherein when the main photographing is performed using the self-timer photographing means only by selecting the specific photographing mode by way of the mode selection means, the exposure condition and/or the focusing position is determined by the exposure determination means and/or the focus determination means in response to the instruction to start the main exposure photographing issued by the photographing instruction means.

10. The imaging apparatus of claim 1, wherein when the main photographing is performed using the self-timer photographing means, the exposure condition and/or the focusing position is determined by the exposure determination means and/or the focus determination means after a predetermined time from the time when the number of target objects detected by the target object detection means is increased.

11. The imaging apparatus of claim 1, wherein when the main photographing is performed using the self-timer photographing means, the exposure condition and/or the focusing position is determined by the exposure determination means and/or the focus determination means after the number of target objects detected by the target object detection means has increased and the result of the target object detection has become steady.

12. The imaging apparatus of claim 1, further comprising a setting means for setting the detection condition of the target object detection means to a condition to detect any one of a plurality of target objects of different states and/or a selection means for selecting any one of a plurality of target objects of different states detected by the target object detection means.

13. The imaging apparatus of 12, wherein setting by the setting means or selection by the selection means is performed when main exposure photographing is performed using the self-timer photographing means or the automatic photographing means.

14. The imaging apparatus of 12, wherein the plurality of target object of different states is target objects oriented in different directions, target objects of different sizes, or target objects of different inclinations.

15. The imaging apparatus of 12, wherein the selection means is a means that does not select a target object of those detected by the target object detection means having a greater variation than a predetermined value.

16. The imaging apparatus of claim 1, further comprising a transmission means for transmitting, when a predetermined target object has not been detected by the target object detection means, that a predetermined target object has not been detected yet to the photographer and/or the subject.

17. The imaging apparatus of claim 16, wherein the transmission means is a means that performs at least one of character and/or mark display, light emitting device control, and speech generation.

18. The imaging apparatus of claim 17, wherein the light emission device control is AF auxiliary light control.

19. The imaging apparatus of claim 18, wherein the AF auxiliary light control includes causing blinking emission of AF auxiliary light.

20. The imaging apparatus of claim 16, wherein the transmission means comprises a plurality of transmission means configured to allow the user to arbitrarily select or set one of the means.

21. The imaging apparatus of claim 1, further comprising a transmission means for transmitting, when a predetermined target object has been detected by the target object detection means, that a predetermined target object has been detected to the photographer and/or the subject.

22. An imaging apparatus, comprising:
an imaging means for generating image data by photographing a subject;
a target object detection means for detecting a target object from the image data;
an exposure determination means for determining an exposure condition;
a focus determination means for determining a focusing position;
a photographing instruction means for instructing main exposure photographing; and
an automatic photographing means for causing main exposure photographing to take place at a predetermined timing after an instruction to perform the main exposure photographing is issued,
wherein when main exposure photographing is performed using the automatic photographing means:
target object detection is performed at least once by the target object detection means during a period from the issuance of the instruction to start the main exposure photographing by the photographing instruction means to the performance of the main exposure photographing, and the exposure condition and/or the focusing position is determined by the exposure determination means and focus determination means according to a result of the target object detection;
when a first focusing position is determined by the focus determination means before the instruction to perform the main exposure photographing is issued by the photographing instruction means, if a predetermined target object is detected by the target object detection means, the focus determination means determines the first focusing position in an area of the detected target object, and when the instruction to perform the main exposure photographing is issued by the photographing instruction means after the first focusing position has been determined, if a predetermined target object is detected by the target object detection means after the first focusing position has been determined, the focus determination means determines a second focusing position in an area of the detected target object, while if a predetermined target object is not detected by the target object detection means, the focus determination means does not perform focusing position determination.

23. An imaging apparatus, comprising:
an imaging means for generating image data by photographing a subject;
a target object detection means for detecting a target object from the image data;
an exposure determination means for determining an exposure condition;
a focus determination means for determining a focusing position;
a photographing instruction means for instructing main exposure photographing; and
an automatic photographing means for causing main exposure photographing to take place at a predetermined timing after an instruction to perform the main exposure photographing is issued,
wherein when main exposure photographing is performed using the automatic photographing means:
target object detection is performed at least once by the target object detection means during a period from the issuance of the instruction to start the main exposure photographing to the performance of the main exposure photographing, and the exposure condition and/or the focusing position is determined by the exposure determination means and focus determination means according to a result of the target object detection; and
the exposure condition and/or the focusing position is determined by the exposure determination means and/or the focus determination means after the number of target objects detected by the target object detection means has increased and a variation in the target objects has become smaller than a predetermined value.

* * * * *